US008781262B2

(12) United States Patent
Rosenblatt

(10) Patent No.: US 8,781,262 B2
(45) Date of Patent: Jul. 15, 2014

(54) SYSTEMS AND METHODS FOR IDENTIFYING OBJECTS AND PROVIDING INFORMATION RELATED TO IDENTIFIED OBJECTS

(75) Inventor: Michael Rosenblatt, Campbell, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 13/555,927

(22) Filed: Jul. 23, 2012

(65) Prior Publication Data
US 2013/0024793 A1 Jan. 24, 2013

Related U.S. Application Data

(63) Continuation of application No. 12/214,387, filed on Jun. 17, 2008, now Pat. No. 8,229,160.

(60) Provisional application No. 61/010,029, filed on Jan. 3, 2008.

(51) Int. Cl.
*G06K 9/00* (2006.01)

(52) U.S. Cl.
USPC ............................................. 382/305

(58) Field of Classification Search
USPC ........ 382/305, 306, 317; 235/385; 705/14.25, 705/14.53, 14.54, 26.8, 28
See application file for complete search history.

(56) References Cited

U.S. PATENT DOCUMENTS

| 5,905,248 | A | 5/1999 | Russell et al. ................ 235/462 |
|---|---|---|---|
| 6,323,846 | B1 | 11/2001 | Westerman et al. .......... 345/173 |
| 6,650,761 | B1 | 11/2003 | Rodriguez et al. ........... 382/100 |
| 6,707,581 | B1 | 3/2004 | Browning ..................... 358/473 |
| 7,055,737 | B1 | 6/2006 | Tobin et al. ................... 235/375 |
| 7,392,945 | B1 | 7/2008 | Philyaw ........................ 235/383 |
| 7,441,706 | B1 | 10/2008 | Schuessler et al. ...... 235/462.15 |
| 2001/0023193 | A1 | 9/2001 | Rhoads ......................... 455/566 |
| 2001/0052540 | A1 | 12/2001 | Rathus et al. ................. 235/379 |
| 2002/0082931 | A1 | 6/2002 | Siegel et al. .................... 705/26 |
| 2003/0004816 | A1* | 1/2003 | Byers, Jr. et al. ............... 705/26 |
| 2004/0224638 | A1 | 11/2004 | Fadell et al. ................. 455/66.1 |
| 2006/0017950 | A1* | 1/2006 | Ikegami et al. .............. 358/1.13 |
| 2006/0175403 | A1* | 8/2006 | Fossen McConnell et al. .............................. 235/385 |
| 2007/0152983 | A1 | 7/2007 | McKillop et al. ............. 345/173 |
| 2008/0056620 | A1* | 3/2008 | Komamura et al. .......... 382/306 |
| 2008/0077264 | A1* | 3/2008 | Irvin et al. ...................... 700/94 |

* cited by examiner

*Primary Examiner* — Andrew W Johns
(74) *Attorney, Agent, or Firm* — Van Court & Aldridge LLP

(57) ABSTRACT

Systems and methods for identifying an object and presenting additional information about the identified object are provided. The techniques of the present invention can allow the user to specify modes to help with identifying objects. Furthermore, the additional information can be provided with different levels of detail depending on user selection. Apparatus for presenting a user with a log of the identified objects is also provided. The user can customize the log by, for example, creating a multi-media album.

23 Claims, 18 Drawing Sheets

SYSTEMS AND METHODS FOR IDENTIFYING OBJECTS AND PROVIDING INFORMATION RELATED TO IDENTIFIED OBJECTS

CROSS-REFERENCE TO RELATED APPLICATIONS

This application is a continuation of U.S. patent application Ser. No. 12/214,387 filed Jun. 17, 2008 (now U.S. Pat. No. 8,229,160), which claims priority to U.S. Provisional Patent Application No. 61/010,029 filed Jan. 3, 2008, the entirety of which are incorporated herein by reference.

BACKGROUND OF THE INVENTION

This relates to portable electronic devices and more particularly to systems and methods for identifying objects and for providing information related to the identified objects.

Portable electronic devices, such as wireless and cellular telephones, digital media players (e.g., music players and video players), and hybrid devices that combine telephone and media playing functionality are known. These portable electronic devices can include, for example, a camera that may be capable of capturing an image of an object, but such devices cannot provide a user with other related information about the object. For example, a user may be in an art museum looking at a piece of art. Although the portable electronic device might be capable of taking a picture of the art, the portable electronic device does not have the capability to provide the user with detailed information about the piece of art, such as the name of the painter or any other related information. In fact, the portable electronic device might not even have the capability of identifying the object itself.

As another example, the user can use a portable electronic device to listen to an audio tour that may provide recorded information about pieces of art. Although the user may be allowed to fast forward or rewind the audio tour, the information provided by the audio tour is fixed. Therefore, the user can not access information about other art in the museum that has not been recorded as part of the audio tour. Moreover, even for the art that is included on the audio tour, the user is limited to the information that has already been recorded.

As still another example, the user can download podcasts about different art exhibits on a portable electronic device. However, the information provided by the podcasts is still fixed because the user can not immediately request for additional information located elsewhere.

Furthermore, while these portable electronic devices may be able to display pictures taken previously, such portable electronic devices may not be able to provide a user with historical information about what the user has already seen. For example, the user may have visited a zoo and may have used the portable electronic device to take a picture of the front entrance of the zoo. Although the user can show the picture to a friend days later, the user can not use the portable electronic device to find the zoo's location.

In view of the foregoing, it would be desirable to provide systems and methods that provide a user with the capability to view an object's identity and obtain additional information about the identified object. It would also be desirable to provide a user with the capability to access a history of previously identified objects.

SUMMARY OF THE INVENTION

In accordance with the invention, a portable electronic device and method of operation are provided in which the device can attempt to identify an object and obtain additional information about the identified object. The portable electronic device can additionally provide a history of previously identified objects to the user.

In some embodiments, in order to detect an object, the portable electronic device can automatically determine the current environment and, based on the determined environment, select a detection technology (e.g., a RFID reader, a camera, and an IR image capture device). For example, if the portable electronic device detects active RFID tags broadcasting signals to the RFID reader, the portable electronic device can use the RFID reader to detect objects.

In some embodiments, the portable electronic device can allow the user to select a mode based on the types of objects that the user wants to identify. Based on the selected mode, the portable electronic device can adjust parameters used for searching an identification database. For example, if the user selects to identify an object in a "MUSEUM" mode, the portable electronic device can search the identification database for objects that are commonly found in a museum. In some embodiments, the portable electronic device can determine the location of the user to help identify an object. For example, if the user is determined to be in Las Vegas and the portable electronic device is set to a "RESTAURANT" mode, the device can limit the search of the identification database to restaurants in Las Vegas.

In some embodiments, if the portable electronic device produces multiple candidate identifications, the portable electronic device can select a best candidate identification based on certain criteria. In response to the user correcting the selected identification, the portable electronic device can automatically modify the criteria based on the user input.

After an object has been identified, the portable electronic device can provide additional information about the identified object. In some embodiments, the portable electronic device can search for the additional information based on the previously-defined mode. In some embodiments, the portable electronic device can provide additional information with incrementally increasing levels of detail (e.g., basic, detailed, and extended).

In addition, a log can be provided to the user, which includes a history of previously identified objects. In some embodiments, the user can customize the log to display information in various ways. For example, the user may create a multi-media album based on objects that were identified in a particular mode. A self-guided museum tour can be created from the multi-media album that provides the right amount of information for the user.

Therefore, in accordance with the present invention, there are provided systems and methods for providing a user with the identity of an object and additional information about the identified object. These systems and methods can include a portable electronic device that can make automatic adjustments to the identification process and adjust the additional information provided based on user input.

There is also provided a portable electronic device apparatus for providing a user with a log of previously identified objects. The user can customize the log by, for example, creating a multi-media album.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE PRESENT INVENTION

Figure 1:
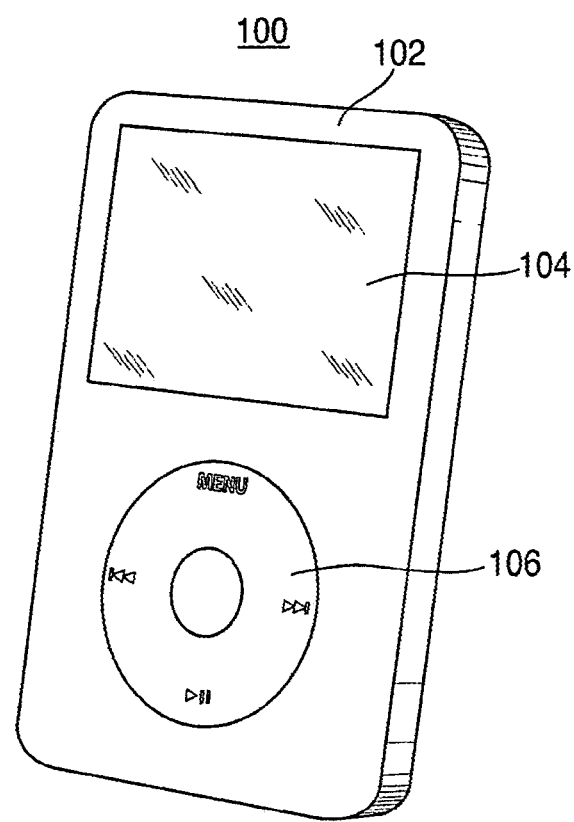
FIG. 1 shows a simplified diagram of a portable electronic system which may be operated in accordance with one embodiment of the present invention.

FIG. 1 shows a simplified diagram of a portable electronic device which may be operated in accordance with one embodiment of the present invention. Persons skilled in the art will appreciate that one or more elements of the described embodiments can be interchanged and/or combined in the present invention. Portable electronic system 100 may include portable electronic device 102. Portable electronic device 102 is shown as including display component 104 and user input component 106. However, other displays and user input components can also be utilized without departing from the spirit of the present invention.

Display component 104 is illustrated in FIG. 1 as a display screen that may be integrated into portable electronic device 102. Display component 104 does not have to be integrated into portable electronic device 102 and may also be external to portable electronic device 102. For example, display component 104 may be a computer monitor, television screen, and/or any other graphical user interface, textual user interface, or combination thereof. Display component 104 may enable portable electronic device 102 to playback the video portion of video content, and/or may serve as part of the user interface, displaying command menus, or serve any other suitable display functions.

User input component 106 is illustrated in FIG. 1 as a click wheel. Persons skilled in the art will appreciate that user input component 106 may also be any other type of user input component or device, such as, for example, a mouse, keyboard, trackball, slider bar, one or more buttons, portable electronic device pad, dial, or any combination thereof. User input component 106 may also include a multi-touch screen such as that described in Westerman et al., U.S. Pat. No. 6,323,846, issued Nov. 27, 2001, entitled "Method and Apparatus for Integrating Manual Input," which is incorporated by reference herein in its entirety. User input component 106 may emulate a rotary phone or a multi-button portable electronic device pad, which may be implemented on a touch screen or the combination of a click wheel or other user input device and a screen. A more detailed discussion of such a rotary phone interface may be found, for example, in U.S. Publication No. 2007/0152983, published Jul. 5, 2007, which is incorporated by reference herein in its entirety.

Figure 2:
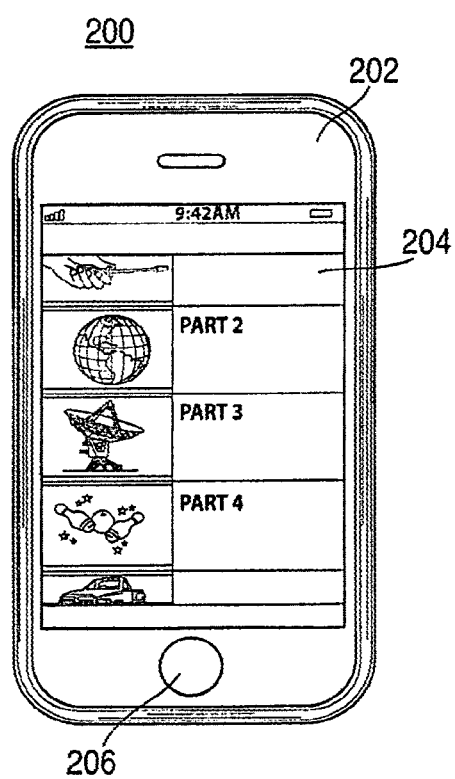
FIG. 2 shows a simplified diagram of another portable electronic system which may be used in accordance with one embodiment of the present invention.

FIG. 2 shows a simplified diagram of another portable electronic system which may be used in accordance with one embodiment of the present invention. Portable electronic system 200 may include portable electronic device 202, which may be, for example, a portable media player, cellular telephone (such as Apple's iPhone), personal organizer or any other portable electronic device. Portable electronic device 202 can incorporate user interface component 204. User interface component 204, as shown in FIG. 2, is a multi-touch screen that may function as both an integrated display screen and as a user input device. Portable electronic device 202 may also include button 206, which may be used in conjunction with user interface component 204. Persons skilled in the art will appreciate that additional buttons and/or other user interface devices may be used without departing from the spirit of the present invention.

Figure 3:
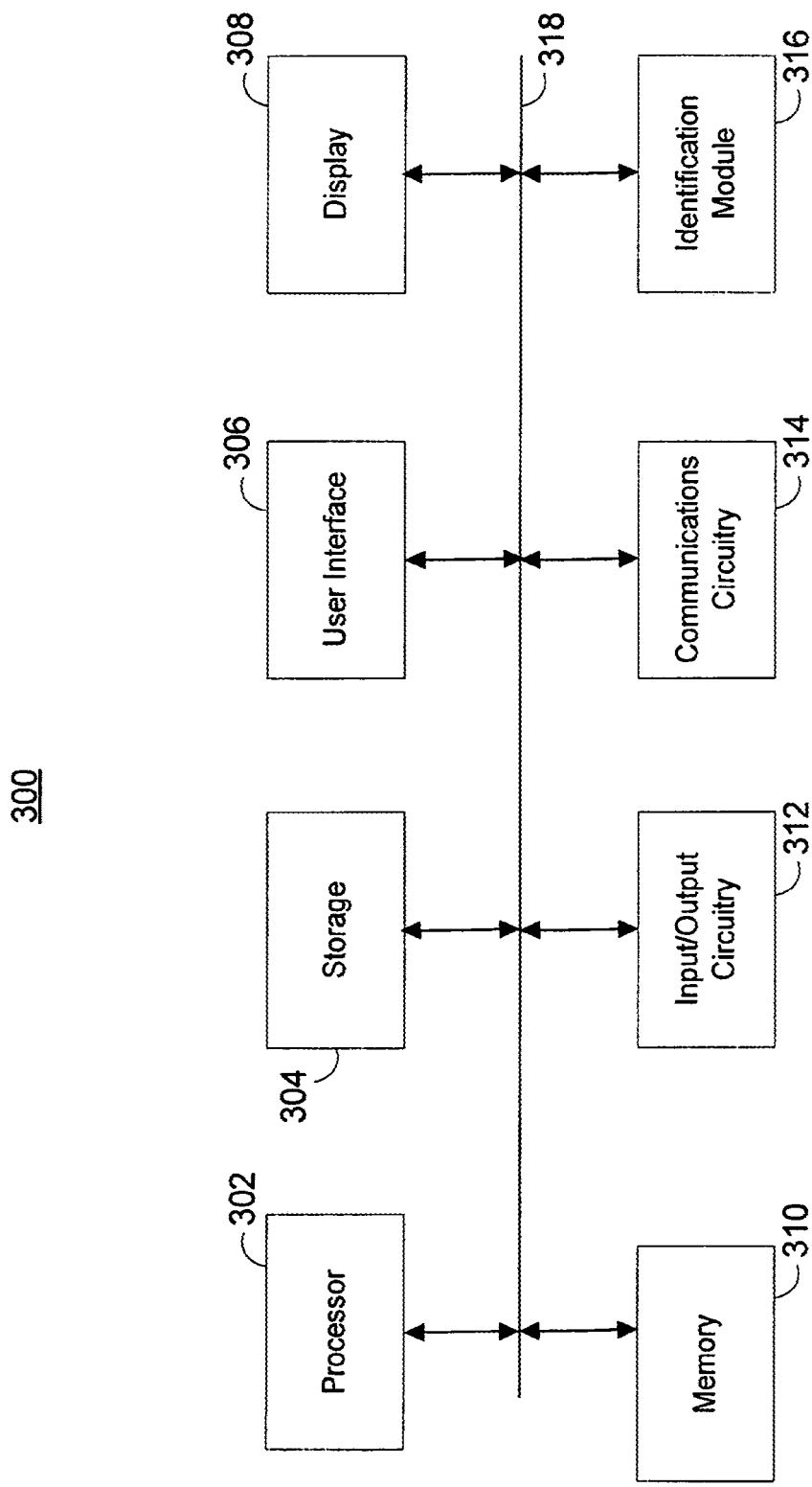
FIG. 3 shows a simplified block diagram of a portable electronic device constructed and used in accordance with one embodiment of the present invention.

FIG. 3 shows a simplified block diagram of a portable electronic device constructed and used in accordance with one embodiment of the present invention. Portable electronic device 300 may be implemented in or as any type of portable electronic device or devices, such as, for example, portable electronic devices 102 and 202 discussed above.

In some embodiments, portable electronic device 300 can be a portable computing device dedicated to processing multi-media data files and presenting that processed data to the user. For example, device 300 can be an iPod available by Apple Inc., of Cupertino, Calif., a dedicated media player (e.g., MP3 player), a game player, a remote controller, a portable communication device, a remote ordering interface, or other suitable personal device. In some embodiments, portable electronic device 300 can be a portable device dedicated to providing multi-media processing and telephone functionality in single integrated unit, such as an iPhone available from Apple Inc.

Portable electronic device 300 may be battery-operated and highly portable so as to allow a user to listen to music, play games or videos, record video or take pictures, place and take telephone calls, communicate with other people or devices, control other devices, and any combination thereof. In addition, portable electronic device 300 may be sized such that it fits relatively easily into a pocket or hand of the user. By being handheld, portable electronic device 300 is relatively small and easily handled and utilized by its user and thus may be taken practically anywhere the user travels.

Portable electronic device 300 can include processor 302, storage 304, user interface 306, display 308, memory 310, input/output circuitry 312, communications circuitry 314, identification module 316, and/or bus 318. In some embodiments, portable electronic device 300 can include more than one of each component or circuitry, shown in FIG. 3, but for the sake of clarity and illustration, only one of each is shown in FIG. 3. In addition, persons skilled in the art will appreciate that the functionality of certain components and circuitry may be combined or omitted and that additional components and circuitry, which are not shown in FIG. 3, may be included in portable electronic device 300.

Processor 302 can include, for example, circuitry for and be configured to perform any function. Processor 302 may be used to run operating system applications, media playback applications, media editing applications, and/or any other application. Processor 302 can drive display 308 and can receive user inputs from user interface 306.

Storage 304 can be, for example, one or more storage mediums, including for example, a hard-drive, flash memory, permanent memory such as ROM, semi-permanent memory such as RAM, any other suitable type of storage component, or any combination thereof. Storage 304 can store, for example, media data (e.g., music and video files), application data (e.g., for implementing functions on device 200), firmware, preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable device 300 to establish a wireless connection), subscription information data (e.g., information that keeps track of podcasts or television shows or other media a user subscribes to), contact information data (e.g., telephone numbers and email addresses), calendar information data, any other suitable data, or any combination thereof.

User interface 306 can allow a user to interact with portable electronic device 300. For example, user interface 306 may take a variety of forms, such as at least one button, keypad, dial, a click wheel, a touch screen or any combination thereof.

Display 308 can accept and/or generate signals for presenting media information (textual and/or graphic) on a display screen, such as those discussed above. For example, display 308 may include a coder/decoder (CODEC) to convert digital media data into analog signals. Display 308 also can include display driver circuitry and/or circuitry for driving display driver(s). The display signals can be generated by processor 302 or display 308. The display signals can provide media information related to media data received from communications circuitry 314 and/or any other component of portable electronic device 300. In some embodiments, display 308, like any other component discussed herein, may be integrated with and/or externally coupled to portable electronic device 300.

Memory 310 can include one or more different types of memory which may be used for performing device functions. For example, memory 310 can include cache, Flash, ROM, RAM, or one or more different types of memory used for temporarily storing data. Memory 310 may be specifically dedicated to storing firmware. For example, memory 310 can be provided for storing firmware for device applications (e.g., operating system, user interface functions, and processor functions).

Input/output circuitry 312 can convert (and encode/decode, if necessary) data, analog signals and other signals (e.g., physical contact inputs, physical movements, analog audio signals, etc.) into digital data, and vice-versa. The digital data may be provided to and received from processor 302, storage 304, memory 310, or any other component of portable electronic device 300. Although input/output circuitry 312 is illustrated in FIG. 3 as a single component of portable electronic device 300, a plurality of input/output circuitry may be included in portable electronic device 300. Input/output circuitry 312 can be used to interface with any input or output component, such as those discussed in connection with FIGS. 1 and 2. For example, portable electronic device 300 can include specialized input circuitry associated with input devices such as, for example, one or more microphones, cameras, proximity sensors, accelerometers, ambient light detectors, etc. Portable electronic device 300 can also include specialized output circuitry associated with output devices such as, for example, one or more speakers, etc.

Communications circuitry 314 can permit portable electronic device 300 to communicate with one or more servers or other devices using any suitable communications protocol. For example, communications circuitry 314 may support Wi-Fi (e.g., a 802.11 protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof.

Identification module 316 can include any suitable type of technology for detecting and identifying objects. For example, identification module 316 may include radio-frequency identification (RFID) tag readers, infrared (IR) image capture device, a camera capable of identifying objects, barcode scanner, biometric reader, proximity card reader, electronic product code reader, any other detection technology, or any combination thereof. In some embodiments, identification module 316 can activate a camera that is operative for capturing images of objects to be identified. In some embodiments, identification module 316 can activate an IR image capture device (e.g., camera or sensors) that is operative for capturing IR images of the objects to be identified. Persons skilled in the art will appreciate that identification module 316 can use any suitable pattern recognition algorithms to identify objects.

In some embodiments, identification module 316 can activate a RFID tag reader that is operative for detecting RFID tags that are located on objects. Identification module 316 may be operative to read passive, active, and/or semi-passive RFID tags. For example, while the user is looking at pieces of art in an art museum, identification module 316 can activate the RFID tag reader to read passive RFID tags. In response to the activation, the RFID tag reader can generate a query to passive RFID tags that are attached to pieces of art nearby. The RFID tags can respond to the query by generating radio frequency signals back to the RFID reader.

Bus 318 may provide a data transfer path for transferring data to, from, or between processor 302, storage 304, user interface 306, display 308, memory 310, input/output circuitry 312, communications circuitry 314, and identification module 316.

Figure 4:
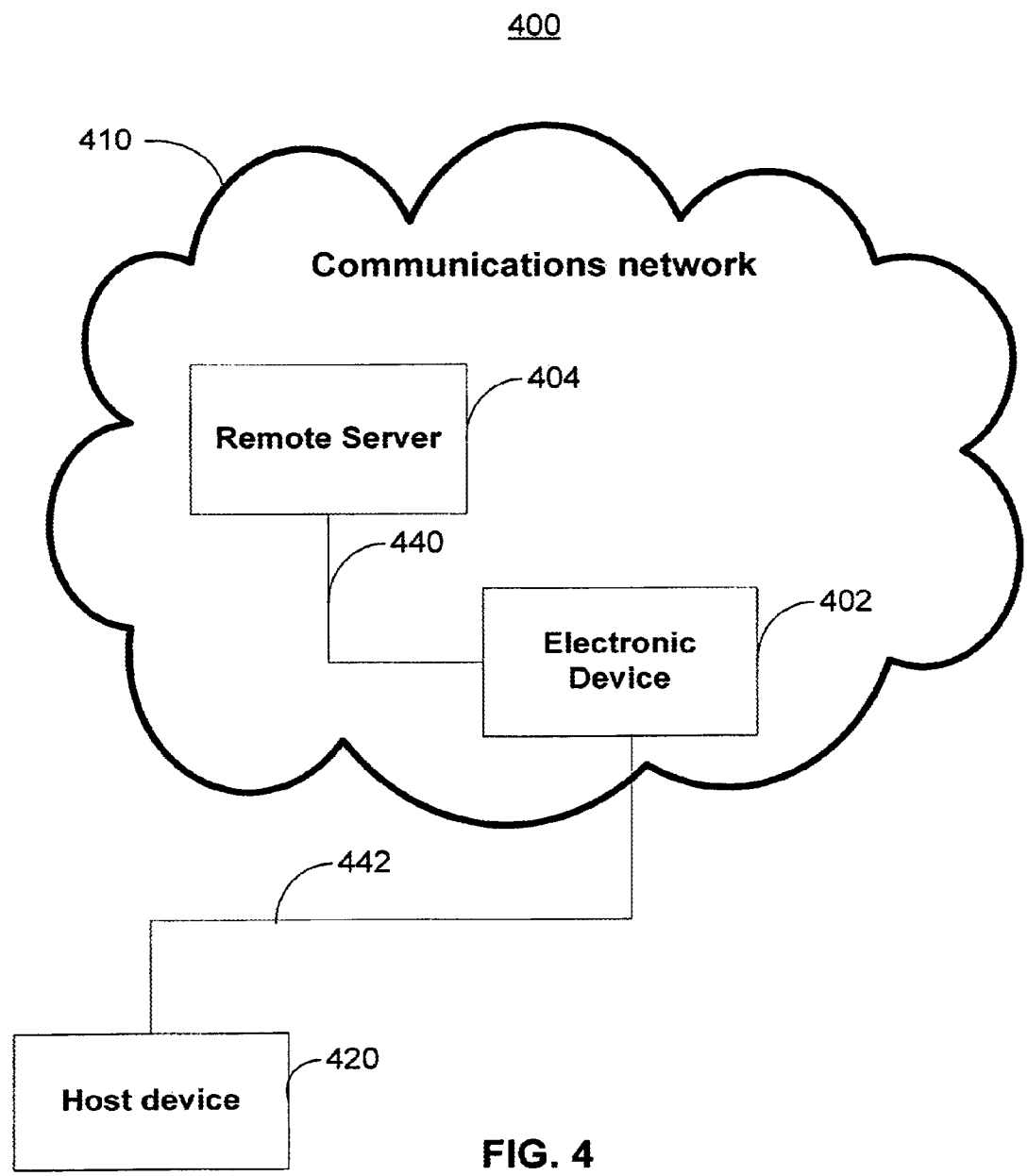
FIG. 4 shows a schematic view of a communications system which can be operated in accordance with one embodiment of the present invention.

FIG. 4 shows a schematic view of a communications system which can be operated in accordance with one embodiment of the invention. Communications system 400 can include portable electronic device 402, and communications network 410, which portable electronic device 402 may use to perform wireless communications with other remote servers within communications network 410 (e.g., remote server 404). Although communications system 400 can include several of communications devices 402, remote servers 404, and hosts 420, only one of each is shown in FIG. 4 to avoid overcomplicating the drawing.

Any suitable circuitry, device, system or combination of these (e.g., a wireless communications infrastructure including communications towers and telecommunications servers) operative to create a communications network can be used to create communications network 410. Communications network 410 may be capable of providing wireless communications using any suitable short-range or long-range communications protocol. In some embodiments, communications network 410 can support, for example, Wi-Fi (e.g., an 802.11 protocol), Bluetooth (registered trademark), high frequency systems (e.g., 900 MHz, 2.4 GHz, and 5.6 GHz communication systems), infrared, other relatively localized wireless communication protocol, or any combination thereof.

In some embodiments, communications network 410 can support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Portable electronic device 402 and remote server 404, when located within communications network 410, can wirelessly communicate over a local wireless communication path such as path 440.

Portable electronic device 402 and remote server 404 can be any suitable device for sending and receiving communications. For example, portable electronic device 402 and remote server 404 can include a media player such as an iPod available by Apple Inc., of Cupertino, Calif., a cellular telephone, a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system). The communications sent and received can be any suitable form of communications, including for example, voice communications (e.g., telephonic communications), data communications (e.g., e-mails, text messages, media messages), or combinations of these.

In some embodiments, portable electronic device 402 or remote server 404 can be coupled to host device 420 for data transfers, synching the portable electronic device, software or firmware updates, or performing any other suitable operation that may require portable electronic device 402 and host device 420 to be coupled. In some embodiments, several portable electronic devices 402 can be coupled to host 420 to share data using host 420 as a server. In some embodiments, portable electronic device 402 can be coupled to several host devices 420 (e.g., for each of the plurality of host devices 420 to serve as a backup for data stored in portable electronic device 402).

Portable electronic device 402 can be coupled with host device 420 over communications link 442 using any suitable approach. For example, portable electronic device 402 can use any suitable wireless communications protocol to connect to host device 420 over communications link 442. As another example, communications link 442 may be a wired link that is coupled to both portable electronic device 402 and host device 420. As still another example, communications link 442 can include a combination of wired and wireless links (e.g., an accessory device for wirelessly communicating with portable electronic device 402 is coupled by a wire to host device 420). Any suitable connector, dongle or docking station may be used to couple portable electronic device 402 and host device 420. A more detailed discussion of a dongle or docking station that can be plugged into portable electronic device 402 may be found, for example, in Fadell et al., U.S. patent application publication No. 2004-0224638, filed Apr. 25, 2003, entitled "Media Player System," which is incorporated by reference in its entirety.

Figure 5:
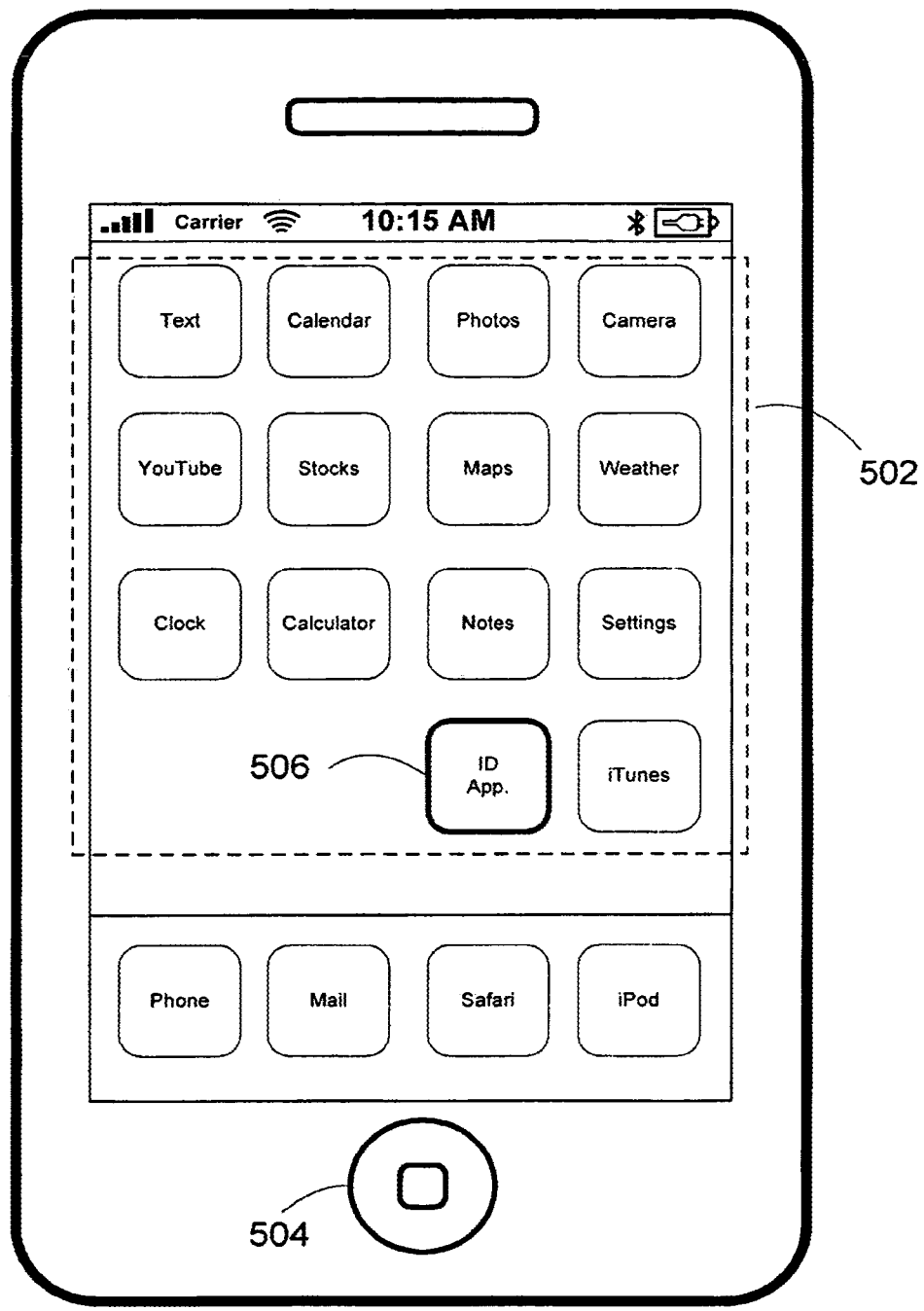
FIG. 5 shows a schematic view of an illustrative display screen of a home screen in accordance with one embodiment of the present invention.

FIG. 5 shows a schematic view of an illustrative display screen of a home screen in accordance with one embodiment of the invention. Display screen 500 may include icons 502 representing applications that the user may access. The applications may include text, calendar, photos, camera, phone, mail, or any other suitable application that a portable electronic device, such as portable electronic device 300 (FIG. 3), may execute. Display screen 500 may be displayed on the portable electronic device when the portable electronic device is first turned on or when the portable electronic device has exited out of an application that was running. Display screen 500 may also be displayed when a user presses button 504 while the portable electronic device is still running an application.

The user may select an icon 502 by placing highlight region 506 over an icon. In some embodiments, in response to receiving a user selection of an identification application, the portable electronic device may activate an identification module, such as identification module 316 (FIG. 3) (in fact, highlight region 506 in FIG. 5 is shown to be highlighting an Identification Application).

Figure 6:
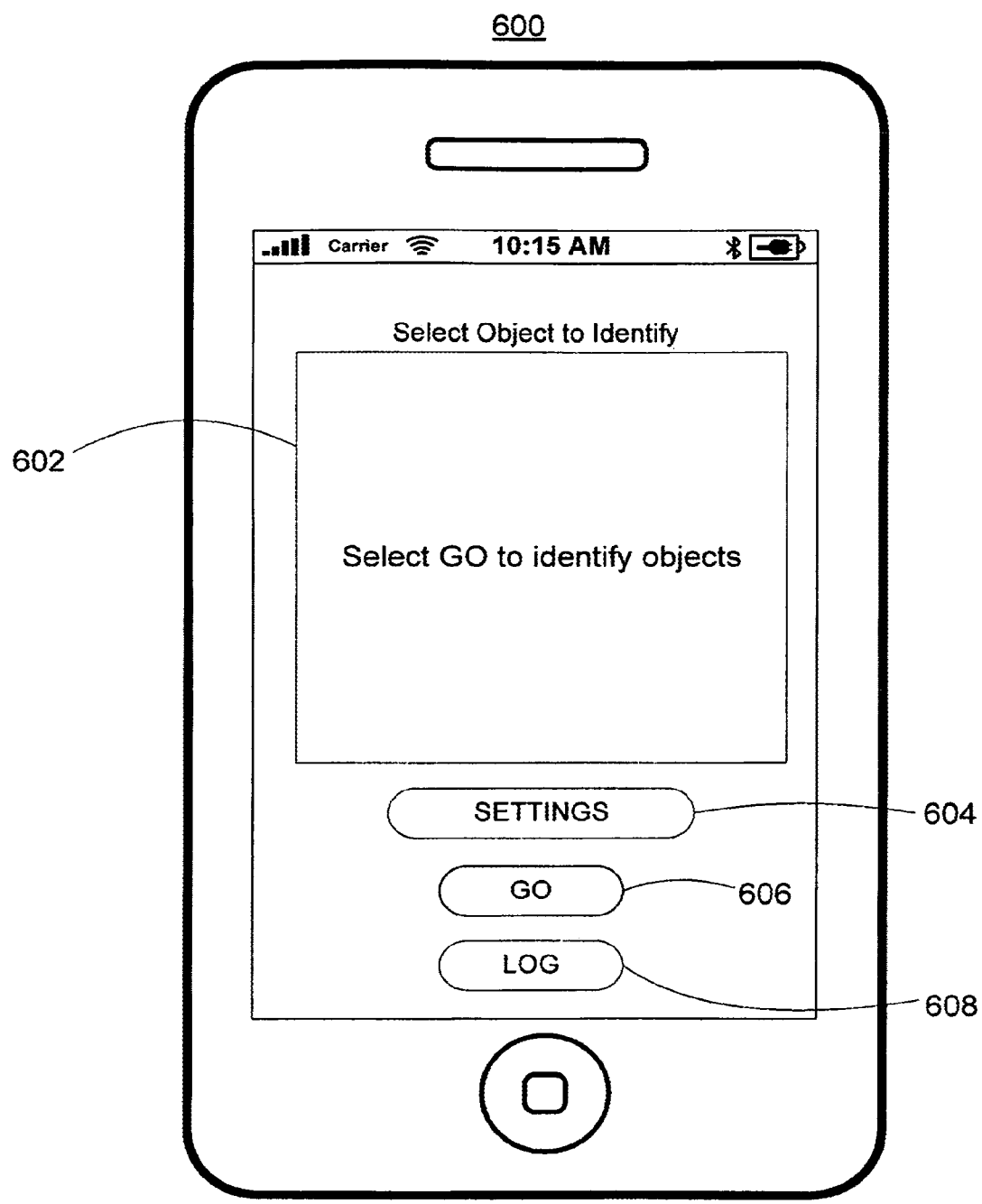
FIG. 6 shows a schematic view of an illustrative display screen for selecting objects to identify in accordance with one embodiment of the invention.

FIG. 6 shows a schematic view of an illustrative display screen for selecting objects to identify in accordance with one embodiment of the invention. Display screen 600 can include identification screen 602. In some embodiments, identification screen 602 can display images as seen through the camera lens. For example, the user may use identification screen 602 to locate one or more objects to be identified. In some embodiments, identification screen 602 can display IR images as seen through the IR camera on the portable electronic device. In some embodiments, identification screen 602 can include messages for using the portable electronic device to detect objects that are labeled with RFID tags. An example of a message can be "Select GO to identify objects."

In some embodiments, display screen 600 can include "SETTINGS" option 604. In response to the user selecting "SETTINGS" option 604, the portable electronic device can provide configuration options to the user.

Figure 7:
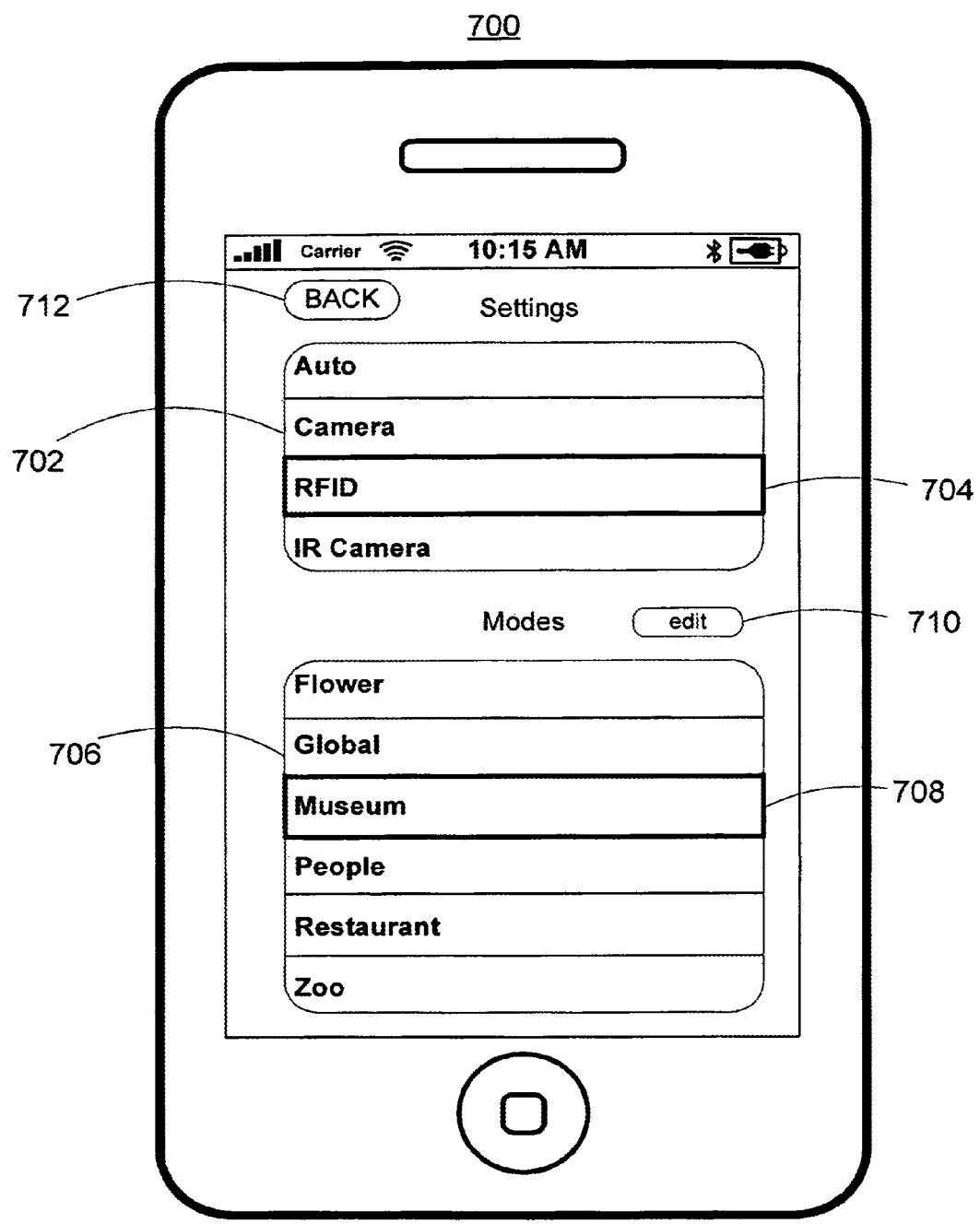
FIG. 7 shows a schematic view of an illustrative display screen for providing configuration options in accordance with one embodiment of the invention.

FIG. 7 shows a schematic view of an illustrative display screen for providing configuration options in accordance with one embodiment of the invention. Display screen 700 can include listings 702, which can allow the user to specify a detection technology that will be used to detect objects. In some embodiments, the user may manually select to use a detection technology (e.g., "RFID," "CAMERA," or "IR CAMERA"). For example, in response to the user selecting "RFID" by placing highlight region 704 over listings 702, the portable electronic device can use a RFID reader to detect objects in the museum.

In some embodiments, in response to the user selecting "AUTO" in listings 702, the portable electronic device can automatically detect the current environment and select a detection technology that is well-suited for the detected environment (or the system may be configured to use the "AUTO" setting as a default). For example, in response to detecting that the portable electronic device is being used in the dark, the portable electronic device can activate an IR image capture device that is capable of detecting objects in darkness. As another example, if the portable electronic device detects active RFID tags broadcasting signals to the RFID reader, the portable electronic device can use the RFID reader to detect objects.

In some embodiments, display screen 700 can include listings 706, which can allow the user to select a mode based on the types of objects that the user wants to identify. In some embodiments, modes can be implemented as metadata tags that are associated with images of objects or RFID tags of objects. For example, an image of an object can be tagged with both "GLOBAL" and "ZOO" modes. Depending on the selected mode, the portable electronic device can adjust parameters that are used to search an identification database. The identification database may be located in local storage (e.g., storage 304), an external source (e.g., remote server 404), or any combination thereof. The identification database can include one or more image databases, IR image databases, photo libraries, RFID identification databases, or any other suitable type of identification databases.

In some embodiments, the identification database can include images of labeled objects (e.g., people, animals, buildings, and other objects). For example, in response to the user selecting "MUSEUM" mode by placing highlight region 708 over listings 706, the portable electronic device can limit the search to images of objects that are commonly found in a museum (e.g., paintings, sculptures, and illustrations). As another example, in response to the user selecting "PEOPLE" mode, the portable electronic device can limit the search to images of people. As still another example, in response to the user selecting "GLOBAL" mode in listings 706, the portable electronic device can perform a search over the entire identification database in order to identify an object.

The portable electronic device can use one or more pattern recognition algorithms to compare the detected object with images in the identification database. For example, suitable types of pattern recognition algorithms can include neural networks, support vector machines, decision trees, K-nearest neighbor, Bayesian networks, Monte Carlo methods, bootstrapping methods, boosting methods, or any combination thereof.

In some embodiments, if the user has selected to use "RFID" detection technology, the portable electronic device can access a RFID identification database. The RFID identification database can include object names corresponding to particular RFID tags. For example, RFID tag "ID_04584" may correspond to the painting "On the Terrace."

In some embodiments, display screen 700 can include "EDIT" option 710, which allows the user to edit modes listed in listings 706. In response to the user selecting "EDIT" option 710, the user may add new modes or delete existing modes. In some embodiments, in response to the user selecting "EDIT" option 710, the portable electronic device can produce lists of objects that are currently associated with the various modes. The user may have the option to change these associations. For example, after identifying an object in "MUSEUM" mode, the user may decide that the object should also be associated with "FLOWER" mode. The user may select "EDIT" option 710 in order to associate the object with both "FLOWER" and "MUSEUM" modes.

Referring back to FIG. 6, in response to a user selecting "GO" option 606, the portable electronic device can attempt to identify objects that are able to be detected. In some embodiments, in addition to using the selected mode to assist in object identification, the portable electronic device can use a GPS receiver, RF triangulation detector or sensor, or any other location circuitry configured, to locate the user. For example, the user may have taken a picture of a restaurant called "Lou's Diner" while in the "RESTAURANT" mode. In response to locating that the user is in Las Vegas, Nev., the portable electronic device can limit the search of the identification database to "Lou's Diner" restaurants in Las Vegas.

Figure 8:
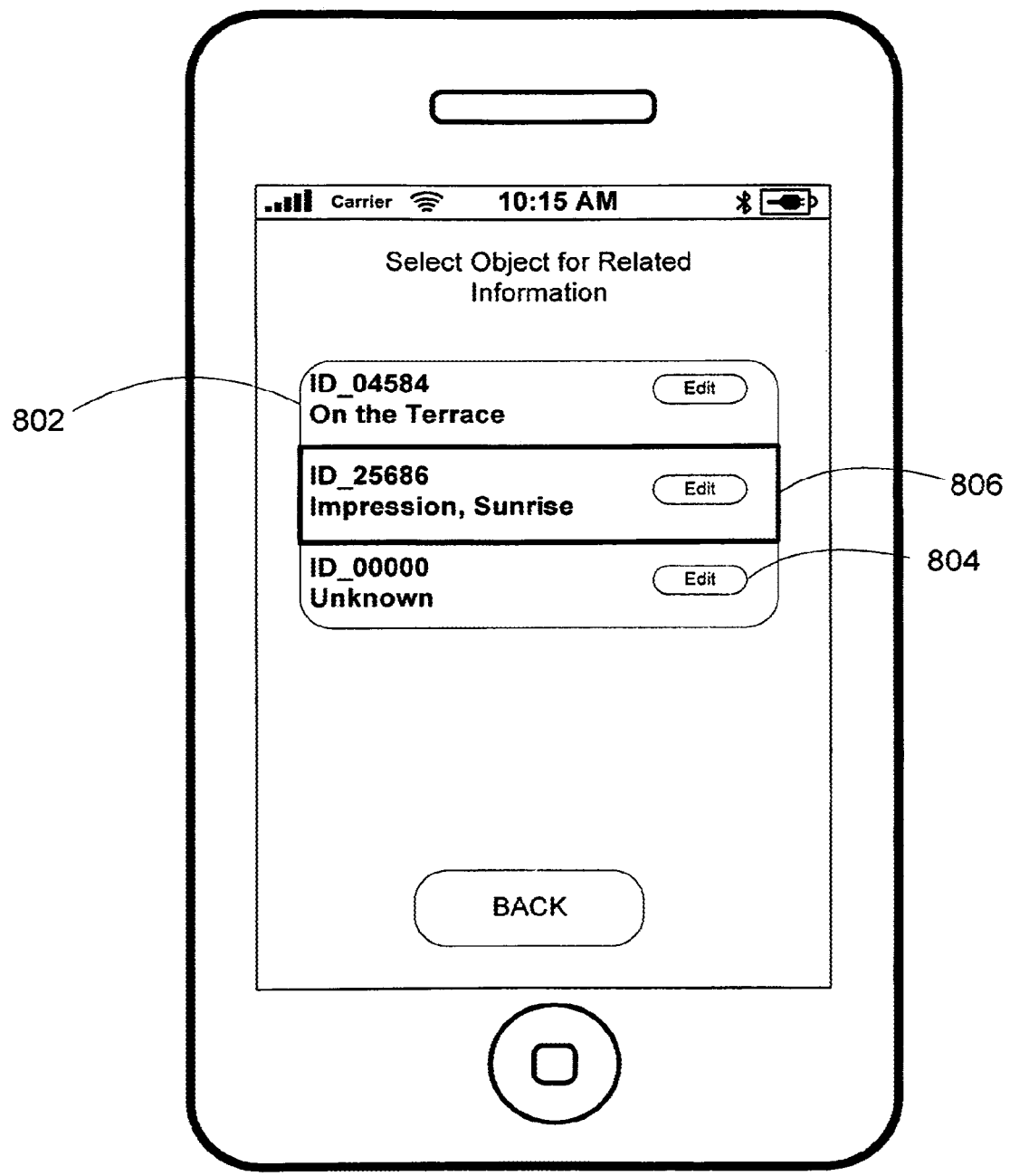
FIG. 8 shows a schematic view of an illustrative display screen of a listing of objects that have been detected and/or identified in accordance with one embodiment of the invention.

FIG. 8 shows a schematic view of an illustrative display screen of a listing of objects that have been detected and/or identified in accordance with one embodiment of the invention. Display screen 800 may include listings 802 of objects (e.g., paintings, artifacts, buildings) that have been detected and/or identified by the portable electronic device. For example, while the user is looking at pieces of art in an art museum, the user may select to activate the RFID tag reader. The RFID tag reader can detect RFID tags that are attached to paintings nearby and display the RFID tags in listings 802. The RFID tag reader may also access a RFID identification database and look for the corresponding object names.

In some embodiments, the portable electronic device can provide "EDIT" option 804 to the user. In some embodiments, in response to receiving a user selection of "EDIT" option 804, the portable electronic device can allow the user to add or change the identity of an object.

Figure 9:
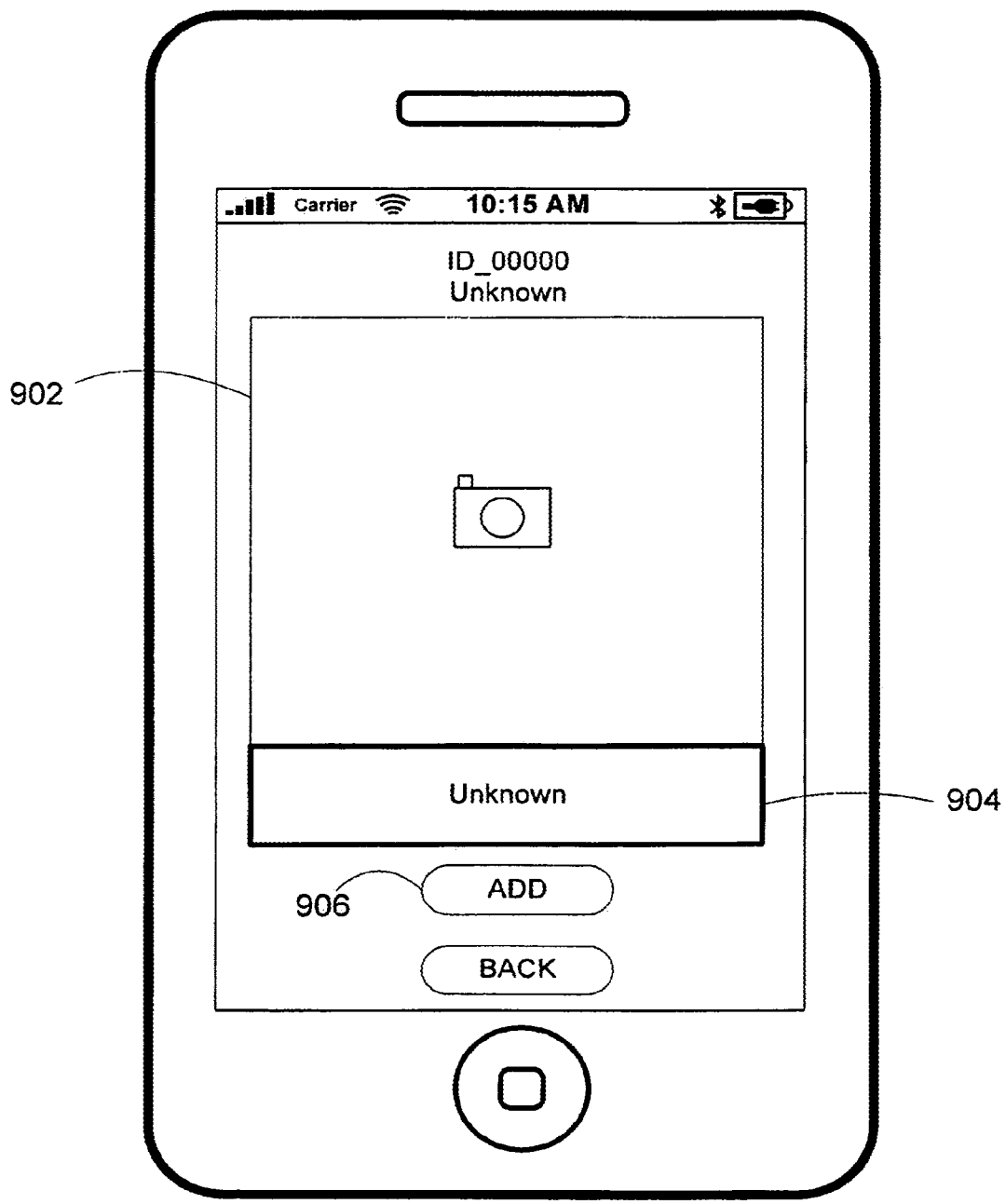
FIG. 9 is a schematic view of an illustrative display screen for editing an object in accordance with one embodiment of the invention.

FIG. 9 is a schematic view of an illustrative display screen for editing an object in accordance with one embodiment of the invention. In some embodiments, display screen 900 can include media screen 902, which can display an image of the object. In some embodiments, if the image is missing or unsatisfactory, the user may take a picture of the object by selecting media screen 902. In some embodiments, the user may identify the object or change the identity of the object by selecting highlight region 904. For example, if the portable electronic device was unable to identify the object or if the portable electronic device incorrectly identified the object, the user may select highlight region 904 to change the label for the object.

In some embodiments, if the portable electronic device finds multiple candidate identifications for an object, the portable electronic device may list all of the multiple candidate identifications in display screen 900. The user may then choose the identity of the object among the candidates identifications or input a new identification.

In some embodiments, if the portable electronic device finds multiple candidate identifications for an object, the portable electronic device may list the candidate identification that the device believes is the best identification match for the object based on certain criteria. The user can be given the ability to directly modify the criteria, and/or the criteria may be self-modifying based on user input. For example, if the user agrees with the best identification match, the user may select the best identification match as the identity of the object. However, if the user disagrees with the best match, the user may input a corrected identity for the object by selecting highlight region 904. In response to the correction, the portable electronic device can use the user input as training data for future identifications.

In some embodiments, the criteria can include support vector machines, in which each support vector machine can be trained to identify a certain object. In response to the user input, the support vector machines can be re-trained based on an enlarged data set, which includes the image of the object combined with the corrected identity. Persons skilled in the art will appreciate that other self-modifying criteria can be used without departing from the spirit of the present invention.

In some embodiments, the user may select "ADD" option 906 to add the identified object to the identification database.

In some embodiments, the user may select "ADD" option 906 to change the mode association(s) of the identified object.

Returning to display screen 800, the user may select a listing by placing highlight region 806 over listings 802. In some embodiments, in response to receiving a user selection of an object, the portable electronic device can search and display information related to the object. In some embodiments, the information acquired can have incrementally increasing levels of detail (e.g., basic, detailed, and extended information).

The information can be located locally, on the device itself (e.g., storage 304), on a local server, on an external source (e.g., a remote server connected to the internet), or any combination of these. In some embodiments, the information can be stored on an information database on the device, the local server, and/or the external source. In some embodiments, the information search can be performed based on the previously-defined mode (e.g., the selected mode in listings 706). For example, if the user is in "MUSEUM" mode, the search can be restricted to museum related information.

In some embodiments, if the portable electronic device detects that it can not connect to an appropriate communications line to access remote information (e.g., lacks WI-FI connectivity), the device can access information stored locally. For example, when the user requests for information related to an identified object, the portable electronic device can search for information that is locally stored on the device or on a local server.

In some embodiments, the portable electronic device can first download information from an external source before providing the relevant information to the user. For example, when a user goes to a museum, the user can plug the portable electronic device in to a suitable connector (e.g., docking station). Once the device is connected, information related to each of the exhibits in the museum can be downloaded and stored locally on the portable electronic device. The user can then use the portable electronic device to identify pieces of art in the museum. When the portable electronic device identifies that the user is viewing a Monet painting, for example, the device can provide information that has been downloaded about the Monet exhibit.

Figure 10:
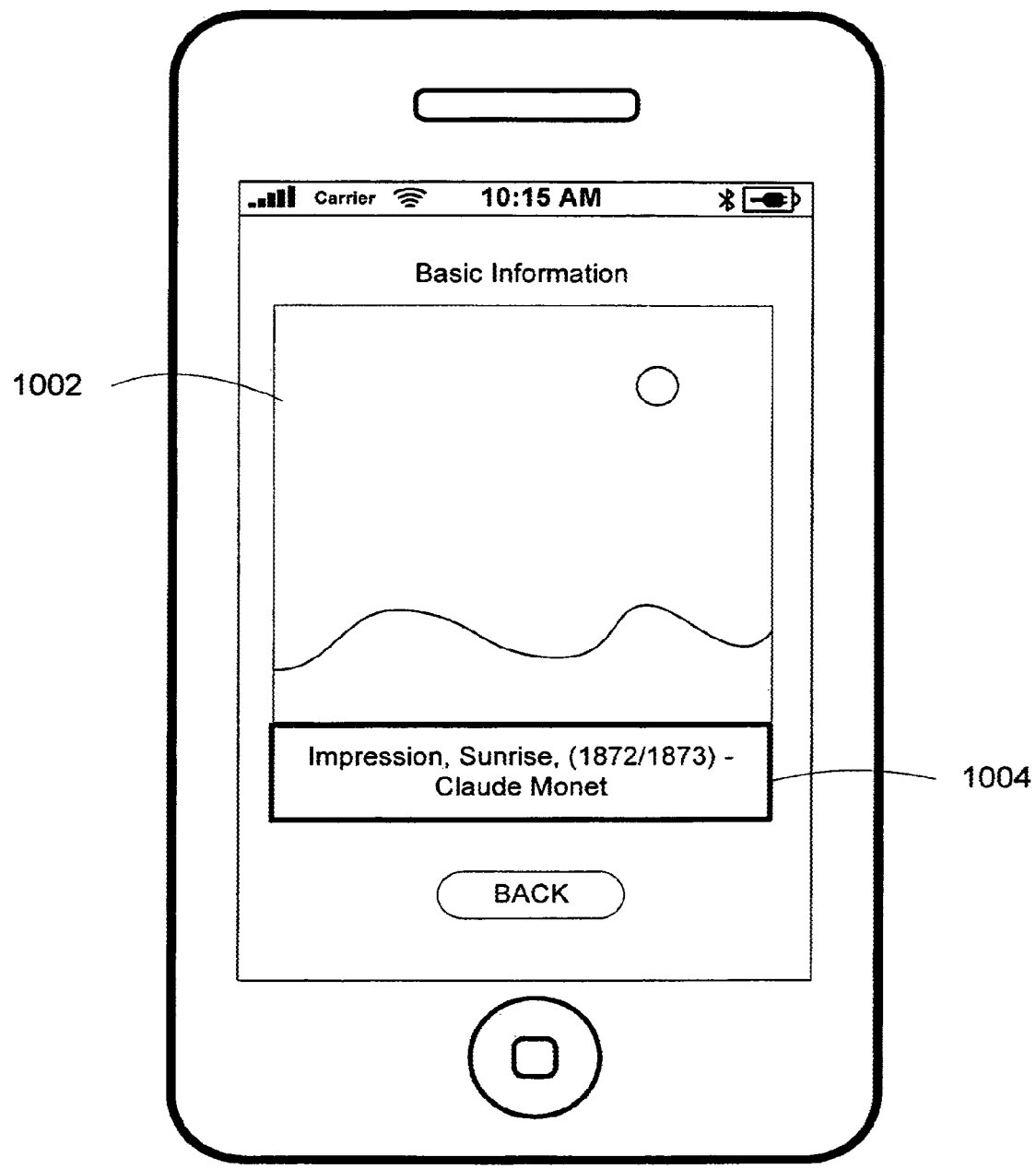
FIG. 10 shows a schematic view of an illustrative display screen for providing basic information related to an identified object in accordance with one embodiment of the invention.

FIG. 10 shows a schematic view of an illustrative display screen for providing basic information related to an identified object in accordance with one embodiment of the invention. Display screen 1000 may include media screen 1002, which may present an image of the identified object captured using the device's camera. In some embodiments, the image of the detected object presented in media screen 1002 can be obtained from a local and/or external source.

In some embodiments, display screen may include basic information region 1004. For example, in response to a user selecting a painting in listings 802 (FIG. 8) in "MUSEUM" mode, the portable electronic device can display an image of the painting in media screen 1002. In addition, the portable electronic device can provide the name, date, and artist of the painting in information region 1004. As another example, in response to a user selecting a restaurant in listings 802 in "RESTAURANT" mode, the portable electronic device can display an image of the front of the restaurant in media screen 1002. In addition, the portable electronic device can provide selectable options to the user, which can include contact information (e.g., phone number and website) and location information of the restaurant. In some embodiments, in response to the user selecting a "DIAL" option, the portable electronic device can allow the user to call the restaurant. In some embodiments, in response to the user selecting a "LOCATE" option, the portable electronic device can locate the restaurant on a map application (e.g., Google Maps™).

Figure 11:
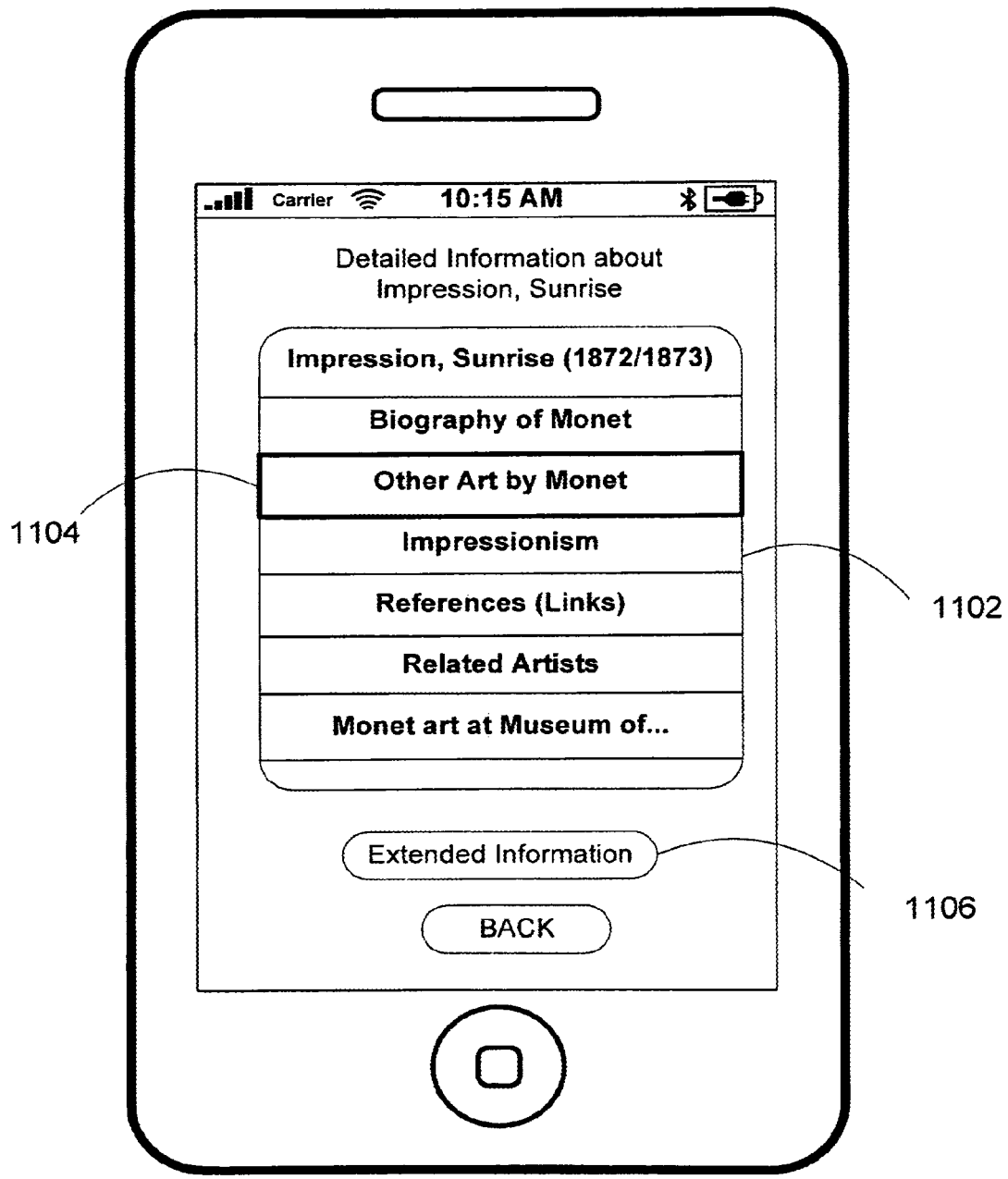
FIG. 11 shows a schematic view of an illustrative display screen providing a listing of detailed information related to an identified object in accordance with one embodiment of the invention.

FIG. 11 shows a schematic view of an illustrative display screen providing a listing of detailed information related to an identified object in accordance with one embodiment of the invention. Display screen 1100 can include listings 1102, which may include information stored both locally and/or remotely on an external source. Related information can include all types of media, such as text, images, clipart, video clips, movies, and any other suitable related information.

The user may select a listing 1102 by placing highlight region 1104 over a listing. In some embodiments, in response to receiving a user selection of a listing, the portable electronic device may access the detailed information and provide the detailed information to the user.

Figure 12:
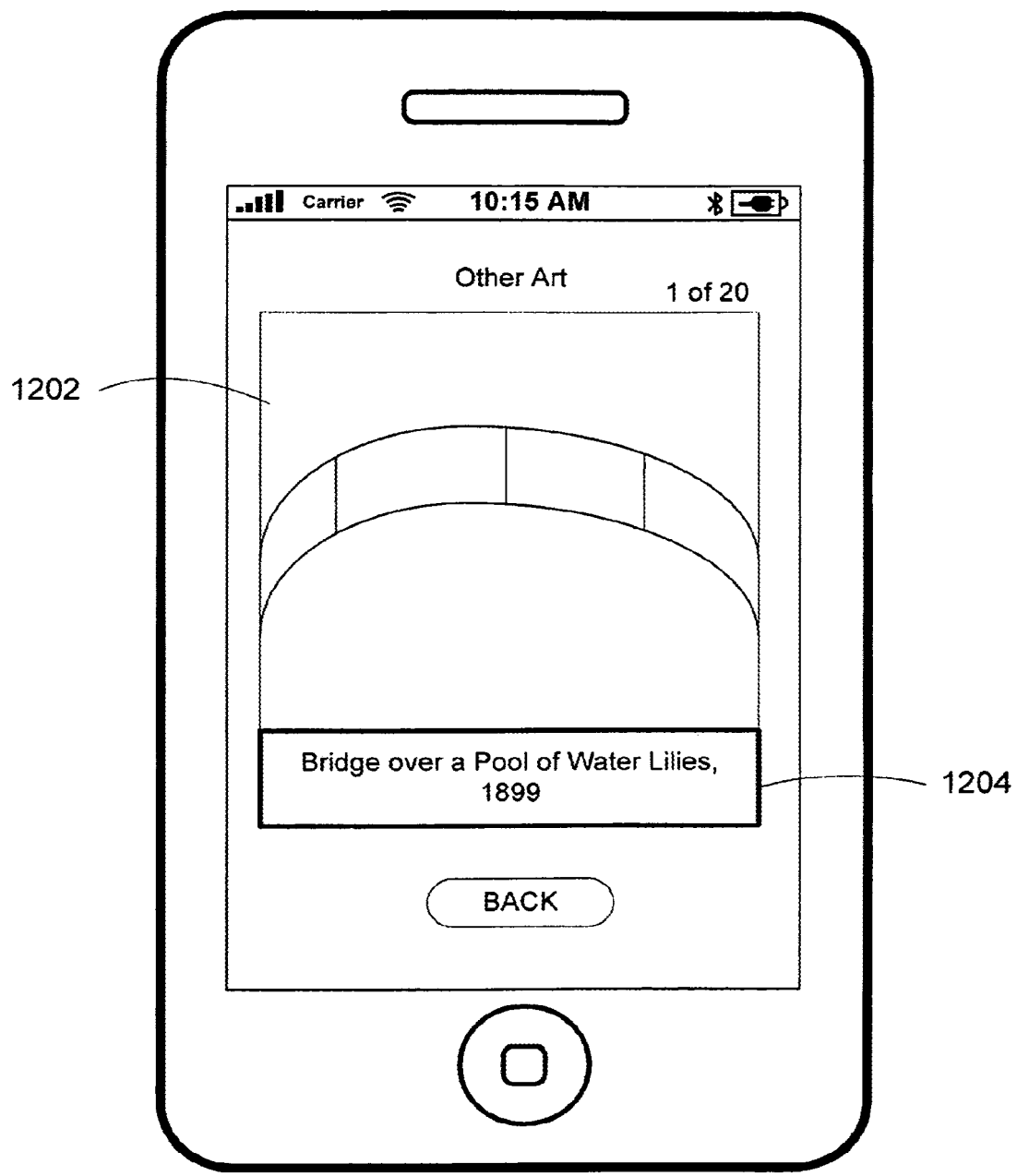
FIG. 12 shows a schematic view of an illustrative display screen of detailed information that includes media in accordance with one embodiment of the invention.

FIG. 12 shows a schematic view of an illustrative display screen of detailed information that includes media in accordance with one embodiment of the invention. Display screen 1200 can include media screen 1202, which can display media related to the object. In some embodiments, media screen 1202 can include a series of images that the user may flip through by accessing a user interface, such as user interface 306 (FIG. 3), on the portable electronic device. In some embodiments, media screen 1202 can display a video. The portable electronic device can provide various media control functions (e.g., play, stop, pause, or any other suitable media control functions), which the user may use to control the media. In some embodiments, media screen 1202 can display text that provides information related to the object. For example, media screen 1202 can display word definitions or information gathered from an electronic encyclopedia (e.g., Wikipedia®). In some embodiments, a mixture of different types of media can be displayed in media screen 1202.

The user may select description region 1204 to find additional detailed information about the media displayed in media screen 1202. In some embodiments, in response to receiving a user selection of description region 1204, the portable electronic device can display additional detailed information related to the media displayed in media screen 1202.

Returning to display screen 1100, the user may select "EXTENDED INFORMATION" option 1106 to view extended information about the identified object. In some embodiments, in response to receiving a user selection of "EXTENDED INFORMATION" option 1106, the portable electronic device can display extended information about the object.

Figure 13:
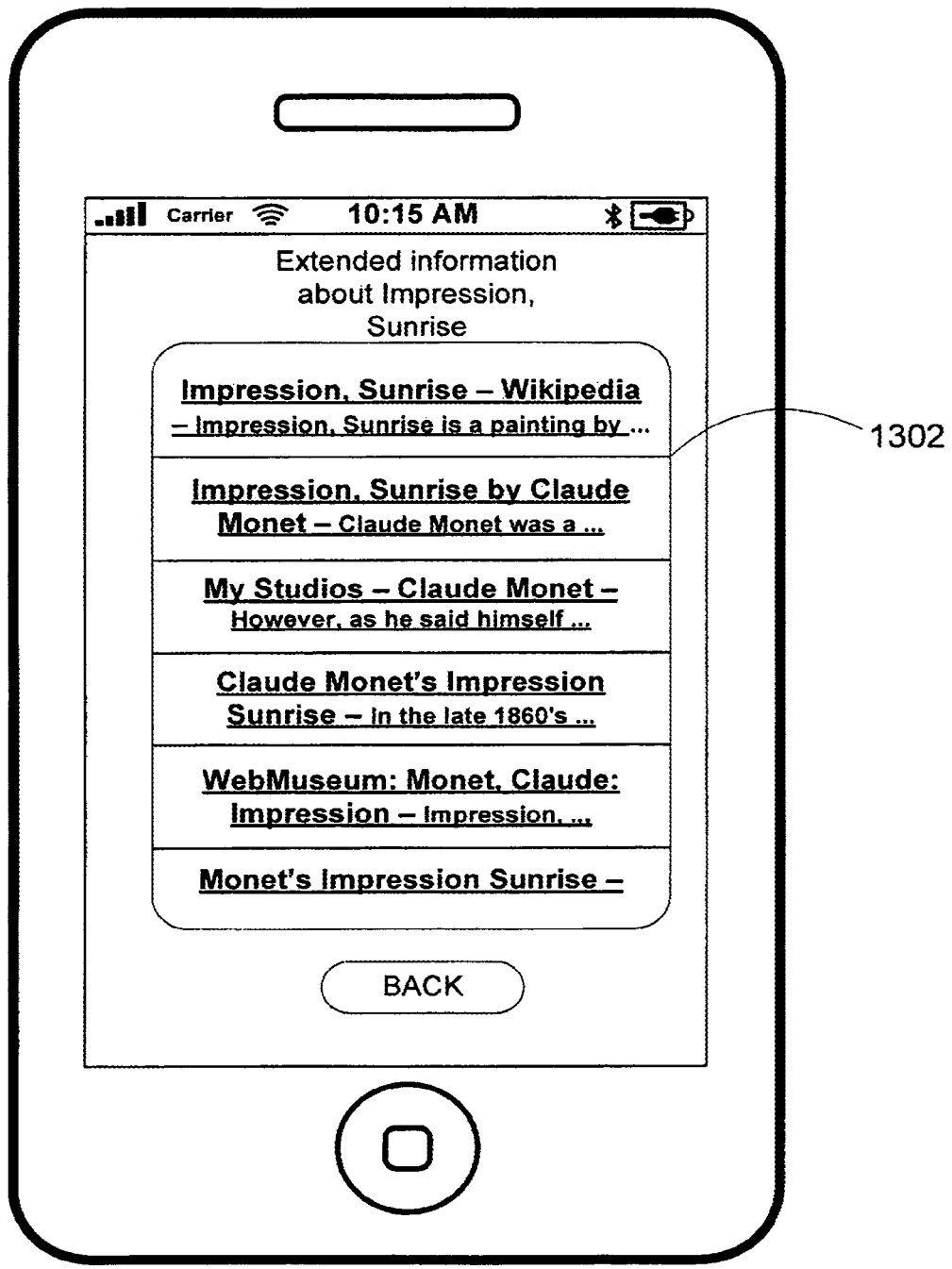
FIG. 13 shows a schematic view of an illustrative display screen of extended information related to an object in accordance with one embodiment of the invention.

FIG. 13 shows a schematic view of an illustrative display screen of extended information related to an object in accordance with one embodiment of the invention. Display screen 1300 can include links 1302, which can provide the user with extended information related to the identified object located on a local source, such as storage 304 (FIG. 3), or an external source, such as remote server 404 (FIG. 4). The portable electronic device can provide links 1302 by conducting a web search based on the identified object and the previously-defined mode. For example, if the identified object is "lily" and the previously-defined mode is "FLOWER," the portable electronic device can search for "lily flower."

In some embodiments, the user may select a link within links 1302 to access a webpage located on a server connected to the Internet. In some embodiments, in response to the user selecting a link, the portable electronic device can display the webpage on a web browser (such as Safari available from Apple Inc.).

Returning to display screen 600, the user may select to view a log, which may include a history of identified objects.

In some embodiments, in response to receiving a user selection of "LOG" option 608, the portable electronic device may display a log of identified objects.

Figure 14:
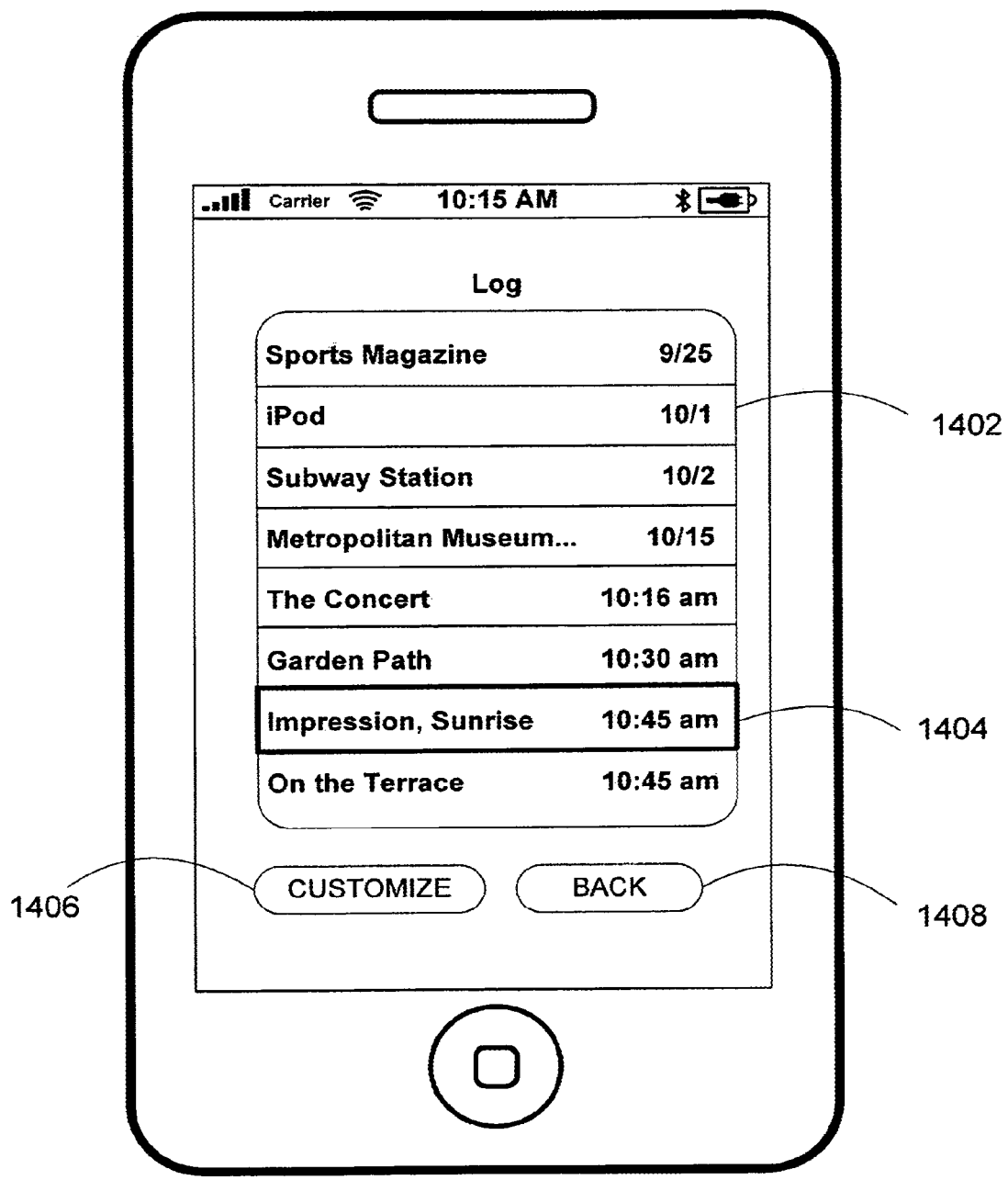
FIG. 14 shows a schematic view of an illustrative display screen for providing a log of identified objects in accordance with one embodiment of the invention.

FIG. 14 shows a schematic view of an illustrative display screen for providing a log of identified objects in accordance with one embodiment of the invention. Display screen 1400 can include listings 1402, which can include a history of previously identified objects. Listings 1402 can include different types of objects (e.g., paintings, people, animals, and buildings). Each listing in listings 1402 can also include the date that the object was identified.

The user may select a listing by placing highlight region 1404 over listings 1402. In some embodiments, in response to receiving a user selection of a listing in listings 1402, the portable electronic device can search and display information related to the identified object. For example, the user can be taken to a display screen similar to or the same as display screen 1000 (FIG. 10), where the user may request display of information with incrementally increasing levels of detail.

In some embodiments, displays screen 1400 can include "CUSTOMIZE" option 1406. For example, in response to the user selecting "CUSTOMIZE" option 1406, the portable electronic device can delete objects in the log that have not been accessed for a period of time (e.g. one year). The user can be provided with the opportunity to set the operational characteristics of the log in a "Preferences" or "System Settings" option instead, which may be accessed from the home page, such as the "Settings" icon shown in FIG. 5.

In some embodiments, the user may select "CUSTOMIZE" option 1406 to archive certain objects before the objects are deleted. In some embodiments, the user may select "CUSTOMIZE" option 1406 to automatically archive the objects that are deleted from the log. In some embodiments, instead of displaying the identified objects in the log by date, the user may select "CUSTOMIZE" option 1406 to sort the identified objects based on previously-defined modes.

In some embodiments, the user may select "CUSTOMIZE" option 1406 to create a multi-media album that includes objects that were identified in a previously-defined mode or modes. For example, the user may have used the portable electronic device to identify objects in the "MUSEUM" mode on a few museum visits. As a result, the user can create a multi-media album by collecting all of the identified objects in the "MUSEUM" mode. The user may let his friend borrow the portable electronic device or upload the multi-media album to his friend's portable electronic device. After receiving the multi-media album, the friend may then create a self-guided tour that organizes the pieces of art in a desired order.

By selecting a particular piece of art, the friend may see basic information, such as the title of the art, the date, and the artist. The friend may find additional information about the art by requesting a search of detailed and extended information. It will be understood that although the previous discussion involved certain customizable features, other suitable customizable features can also be implemented in the present invention.

FIGS. 15A-15D show a flowchart of an illustrative process for providing information related to an identified object in accordance with one embodiment of the invention. Process 1500 begins at step 1502. At step 1504, a portable electronic device can begin to receive user instructions. For example, the portable electronic device can provide display screen 600 (FIG. 6) to a user. At step 1506, the portable electronic device can determine whether an instruction to select a new detection technology has been received. For example, the portable electronic device can determine whether the user has selected "SETTINGS" option 604 and a detection technology in listings 702 (FIG. 7).

If, at step 1506, the portable electronic device determines that an instruction to select a new detection technology has not been received, process 1500 moves to step 1508. If, at step 1506, the portable electronic device instead determines that an instruction to select a new detection technology has been received, process 1500 moves to step 1510. At step 1510, the portable electronic device can select the new detection technology based on user instructions. For example, the user may manually select a detection technology (e.g., "CAMERA," "RFID," or "IR CAMERA"). The user may also select "AUTO" in listings 702, so that the portable electronic device can automatically determine the current environment of the portable electronic device. In response to determining the current environment, the portable electronic device can select to use a detection technology that is well-suited for the environment. The user may save the changes by selecting "BACK" option 712. Process 1500 then moves to step 1508.

At step 1508, the portable electronic device can determine whether an instruction to select a new mode has been received. For example, the portable electronic device can determine whether the user has selected "SETTINGS" option 604 and a new mode in listings 706 (FIG. 7). If, at step 1508, the portable electronic device determines that an instruction to select a new mode has not been received, process 1500 moves to step 1512. If, at step 1508, the portable electronic device instead determines that an instruction to select a new mode has been received, process 1500 moves to step 1514. At step 1514, the portable electronic device can change the mode to the selected mode. The user may save the changes by selecting "BACK" option 712. Process 1500 the moves to step 1512.

At step 1512, the portable electronic device can determine whether an instruction to identify an object has been received. If, at step 1512, the portable electronic device determines that an instruction to identify an object has been received, process 1500 moves to step 1516. For example, the user may select to identify an object by selecting "GO" option 606 (FIG. 6). At step 1516, the portable electronic device can detect and/or identify the object. In response to the user selecting "GO" option 606, the portable electronic device can detect the object using the detection technology. After detecting the object, the portable electronic device can search an identification database to attempt to identify the detected object based on the selected mode.

At step 1518, the portable electronic device can display the detected and/or identified object. For example, the portable electronic device can direct the user to a display screen such as display screen 800 (FIG. 8), which includes listings 802. The portable electronic device can display the detected and/or identified object in listings 802.

At step 1520, the portable electronic device can determine whether the object was correctly identified. If, at step 1520, the portable electronic device determines that the object was correctly identified, process 1500 moves to step 1522.

If, at step 1520, the portable electronic device instead determines that the object was incorrectly identified, process 1500 moves to step 1524. At step 1524, the portable electronic device can correct the object's identity. For example, in response to the user selecting "EDIT" option 804 (FIG. 8), the user can be directed to a display screen such as display screen 900, which includes highlight region 904. The user can select highlight region 904 to change the object's identity. After correcting the object's identity, process 1500 moves to step 1522. At step 1522, the portable electronic device can store the identified object in the identification database. For example, the user can store the identified object in the database by selecting "ADD" option 906.

After the portable electronic device finishes storing the identified object, process 1500 then moves to step 1526. At step 1526, the portable electronic device can search for basic information related to the identified object. For example, in response to the user selecting an identified object in listings 802 (FIG. 8), the portable electronic device can search for basic information that can provide pertinent information about the object. At step 1528, the portable electronic device can provide the basic information to the user. For example, the user can be directed to a display screen such as display screen 1000 (FIG. 10), which can include media screen 1002. In some embodiments, display screen 1000 can include basic information region 1004.

At step 1530, the portable electronic device can determine whether it has received an instruction to search for detailed information. For example, the user may select basic information region 1004 to request detailed information, which can provide additional information related to the object. If, at step 1530, the portable electronic device determines that it has received instruction to search for detailed information, process 1500 moves to step 1532. At step 1532, the portable electronic device can search for detailed information related to the identified object. After the portable electronic device has searched for detailed information, process 1500 then moves back to step 1528. At step 1528, the portable electronic device can provide the detailed information to the user. For example, the portable electronic device may direct the user to a display screen such as display screen 1100 (FIG. 11), which includes listings 1104. The user may select a listing in listings 1104 to access detailed information related to the identified object. An example of detailed information is provided in display screen 1200 (FIG. 12).

If, at step 1530, the portable electronic device instead determines that it has not received an instruction to search for detailed information, process 1500 then moves to step 1534. At step 1534, the portable electronic device can determine whether it has received an instruction to search for extended information. For example, the user may select "EXTENDED INFORMATION" option 1106 (FIG. 11) to request extended information. Extended information can include links that are considered relevant to the object.

If, at step 1534, the portable electronic device determines that it has not received an instruction to search for extended information, process 1500 moves back to step 1504 (FIG. 15A), where the portable electronic device can continue to receive user instructions. For example, the user may have selected "BACK" options in FIGS. 8-13 in order to return to display screen 600 (FIG. 6). If, at step 1534, the portable electronic device instead determines that it has received an instruction to search for extended information, process 1500 moves to step 1536. At step 1536, the portable electronic device can search for extended information related to the identified object. After the portable electronic device has searched for the extended information, process 1500 moves back to step 1528. At step 1528, the portable electronic device can provide the extended information to the user. For example, the portable electronic device may direct the user to a display screen such as display screen 1300 (FIG. 13), which includes listings 1302. The user may select a listing in listings 1302 to access extended information related to the identified object.

Referring back to FIG. 15A, if, at step 1512, the portable electronic device instead determines that an instruction to identify an object has not been received, process 1500 moves to step 1538. At step 1538, the portable electronic device may determine whether it has received an instruction to provide a log. For example, the user may select "LOG" option 608 (FIG. 6) to request a history of identified objects. If, at step 1538, the portable electronic device determines that an instruction to provide a log has not been received, process 1500 ends at step 1540.

If, at step 1538, the portable electronic device instead determines that an instruction to provide a log has been received, process 1500 moves to step 1542. At step 1542, the portable electronic device may provide a log of the identified objects to the user. For example, the portable electronic device may direct the user to a display screen such as display screen 1400 (FIG. 14), which includes listings 1402 of identified objects.

At step 1544, the portable electronic device can determine if it has received a selection of an identified object in the log. For example, the user may select an identified object in listings 1402 by placing highlight region 1404 over a listing. If the portable electronic device determines that it has received a selection of an identified object, process 1500 returns to step 1526, as discussed previously. If the portable electronic device determines that it has not received a selection of an identified object, process 1500 moves to step 1546. At step 1546, the portable electronic device can determine if it has received a selection of a customized option. For example, the user may select "CUSTOMIZE" option 1406 to customize the log.

If, at step 1546, the portable electronic device determines that it has not received a selection of a customized option, process 1500 moves back to step 1504 (FIG. 15A), as discussed previously. For example, the user may select "BACK" option 1408 (FIG. 14) to return to display screen 600 (FIG. 6). If, at step 1546, the portable electronic device instead determines that it has received a selection of a customized option, process 1500 moves to step 1548. At step 1548, the portable electronic device can determine whether it has received an instruction to archive certain identified objects.

If, at step 1548, the portable electronic device determines that it has not received an instruction to archive certain identified objects, process 1500 moves to step 1550. If, at step 1548, the portable electronic device instead determines that it has received an instruction to archive certain identified objects, process 1500 moves to step 1552. At step 1552, in response to receiving the instruction, the portable electronic device can allow the user to archive those objects. After archiving the objects, process 1500 moves to step 1550.

At step 1550, the portable electronic device can determine whether it has received an instruction to delete identified objects if the objects have not been accessed for period of time. If, at step 1550, the portable electronic device determines that it has not received an instruction to delete identified objects, process 1500 moves to step 1554. If, at step 1550, the portable electronic device instead determines that it has received an instruction to delete identified objects, process 1500 moves to step 1556. At step 1556, in response to receiving the instruction, the portable electronic device can monitor the deletion of identified objects if the objects have not been accessed for a period of time. After the portable electronic device has been configured to monitor the deletion of these objects, process 1500 moves to step 1554.

At step 1554, the portable electronic device can determine whether it has received an instruction to sort the identified objects based on previously-defined modes. If, at step 1554, the portable electronic device determines that it has not received an instruction to sort the identified objects, process 1500 moves to step 1558. If, at step 1554, the portable electronic device instead determines that it has received an instruction to sort the identified objects, process 1500 moves to step 1560. At step 1560, in response to receiving the instruction, the portable electronic device can allow the user to sort the identified objects in the log based on the previously-defined modes. After sorting the identified objects, process 1500 moves to step 1558.

Figure 15A:
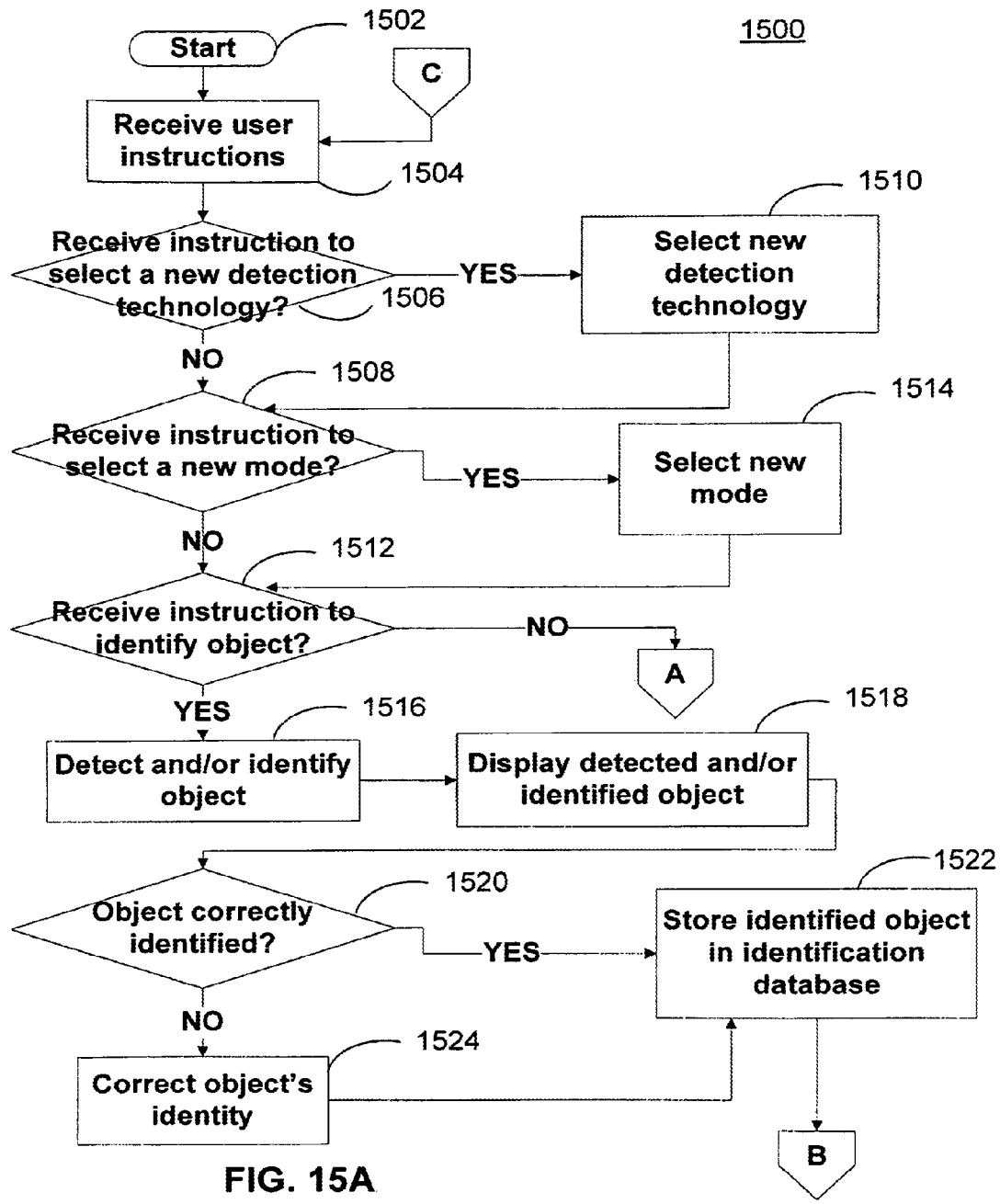
FIGS. 15A-15D show a flowchart of an illustrative process for providing information related to an identified object in accordance with one embodiment of the invention.
Figure 15B:
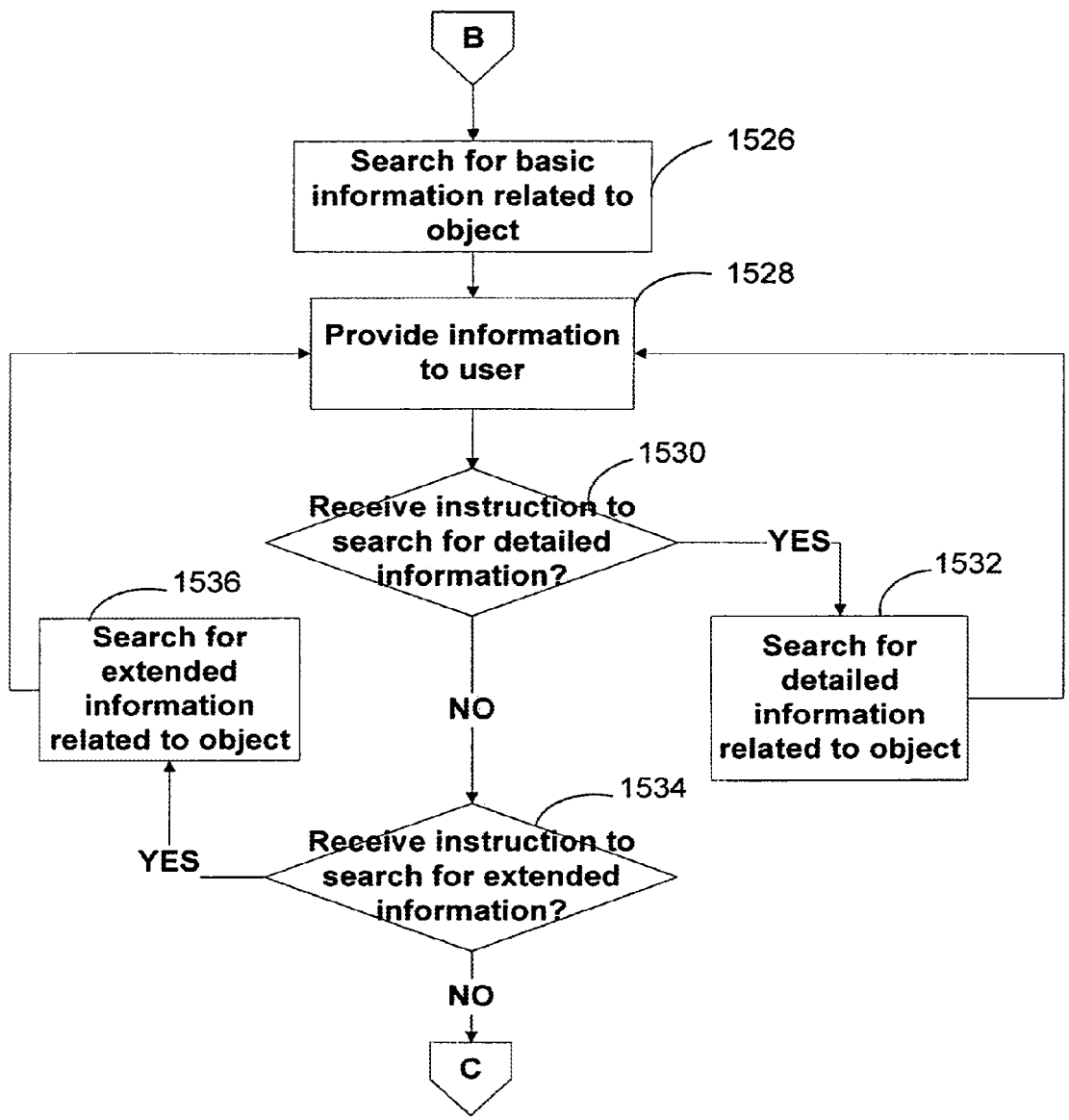
Figure 15C:
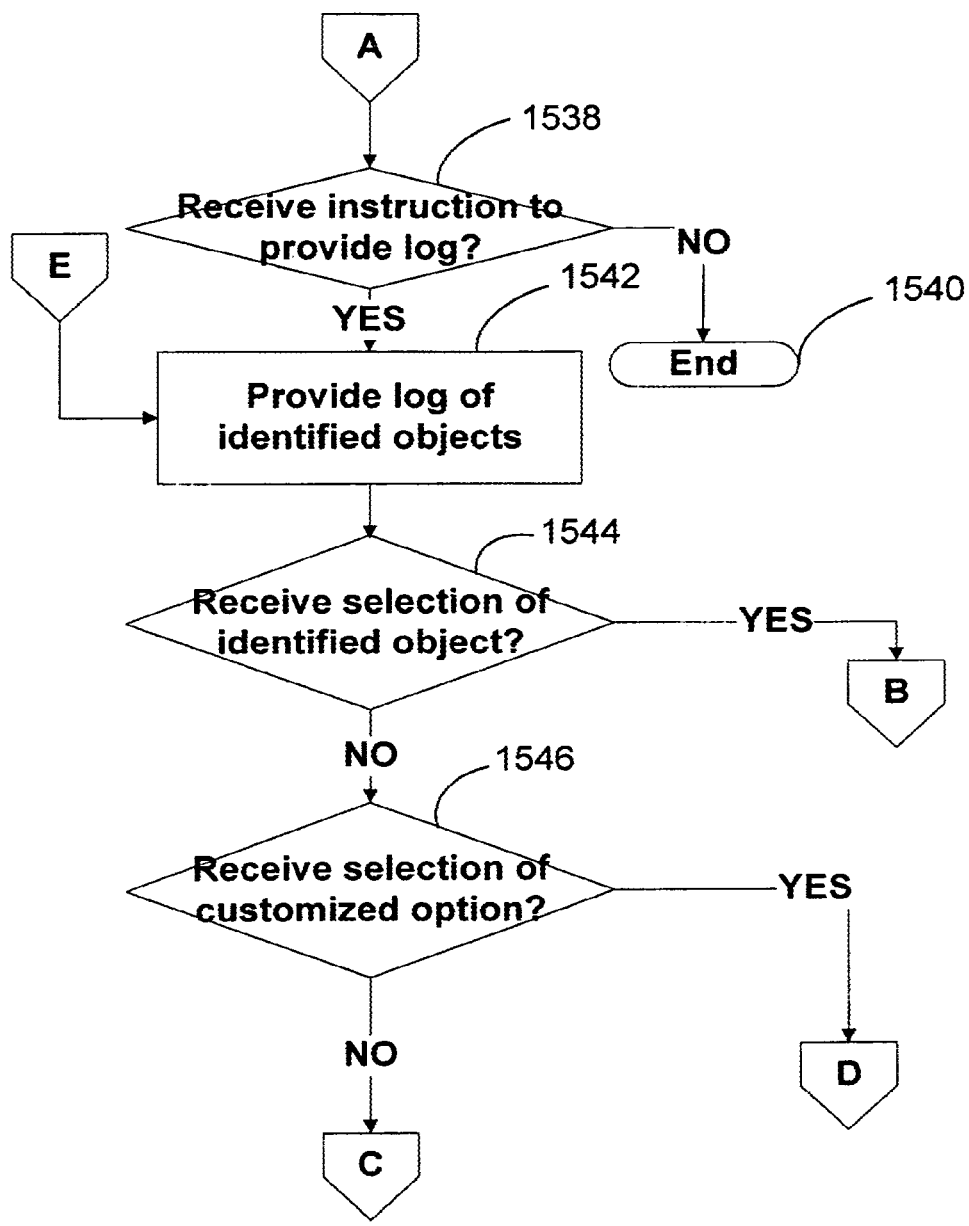
Figure 15D:
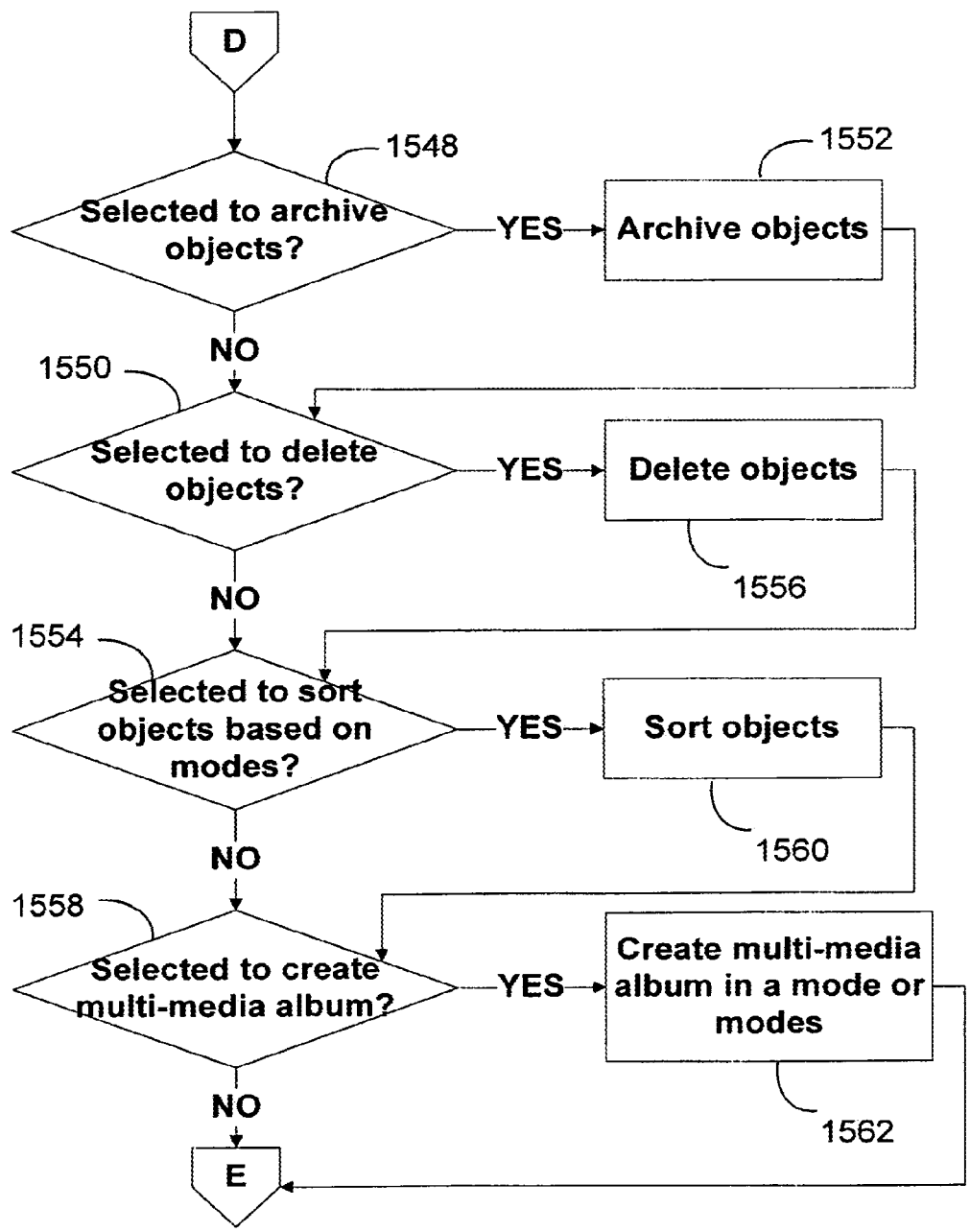

At step 1558, the portable electronic device can determine whether it has received an instruction to create a multi-media album that includes objects that were identified in a previously-defined mode or modes. If, at step 1558, the portable electronic device determines that it has not received an instruction to create a multi-media album, process 1500 moves back to step 1542 to provide the log to the user (FIG. 15C). If, at step 1558, the portable electronic device instead determines that it has received an instruction to create a multi-media album, process 1500 moves to step 1562. At step 1562, the portable electronic device can allow the user to create a multi-media album. After the user has created the multi-media album, process 1500 moves back to step 1542.

Thus it is seen that systems and methods are provided for identifying objects and obtaining additional information about the identified objects. It is also seen that systems and methods are provided for viewing a history of previously identified objects. Persons skilled in the art will appreciate that the invention can be practiced by other than the described embodiments, which are presented for purposes of illustration and not of limitation, and the present invention is limited only by the claims which follow.

What is claimed is:

1. An apparatus for providing a history of identified objects, the apparatus comprising:
   memory operative to store the identified objects;
   an output operative to provide a log of the identified objects to a user;
   an input operative to accept user selections;
   a display; and
   a processor operative to:
      accept an input user selection of an identified object in the log;
      determine information related to the selected object for display to the user on the display; and
      send the information to the display, wherein the processor provides the user with capability to sort the identified objects in the log based on previously-defined modes used by the apparatus to identify the objects.

2. The apparatus of claim 1, wherein the processor provides the user with capability to archive the identified objects in the log.

3. The apparatus of claim 1, wherein the log includes dates that the objects were identified.

4. The apparatus of claim 1, wherein at least a first object of the objects was identified by the apparatus in a first mode of the previously-defined modes, and wherein at least a second object of the objects was identified by the apparatus in a second mode of the previously-defined modes.

5. The apparatus of claim 1, wherein the processor provides the user with capability to create a multi-media album that includes each identified object of the identified objects that was identified by the apparatus in a particular mode of the previously-defined modes.

6. The apparatus of claim 1, wherein the processor provides the user with the capability to request the information to be displayed on the display with incrementally increasing levels of detail associated with the identified objects.

7. An apparatus for providing a history of identified objects, the apparatus comprising:
   memory operative to store the identified objects;
   an output operative to provide a log of the identified objects to a user;
   an input operative to accept user selections;
   a display; and
   a processor operative to:
      accept an input user selection of an identified object in the log;
      determine information related to the selected object for display to the user on the display; and
      send the information to the display, wherein the processor automatically deletes at least one identified object of the identified objects in the log that have not been accessed for a period of time.

8. The apparatus of claim 7, wherein, for each one of the previously-defined modes, the apparatus uses a different respective set of parameters to search an identification database for identifying at least one of the objects.

9. A method for finding data related to a plurality of objects on an electronic device, the method comprising:
   determining, using an identification ("ID") module of the electronic device, whether at least one instruction to provide a log of a sub-plurality of the plurality of objects has been received, wherein the sub-plurality of the plurality of objects have been previously identified by the electronic device in a previously-defined mode of the electronic device;
   in response to determining that the at least one instruction to provide the log has been received, providing, using a display screen of the electronic device, the log of the sub-plurality of the objects;
   determining, using the ID module, whether a selection of at least one object of the sub-plurality of the objects has been received; and
   in response to the determining that the selection of the at least one object of the sub-plurality of the objects has been received, searching, using the ID module, for information associated with the at least one object.

10. The method of claim 9, further comprising providing, using the display screen, a user with the information associated with the at least one object.

11. The method of claim 10, further comprising providing, using the display screen, the user with an option to receive additional information associated with the at least one object.

12. The method of claim 9, further comprising in response to the determining that the selection of the at least one object of the sub-plurality of the objects has not been received, determining, using the ID module, whether a selection of a customized option of the log has been received.

13. The method of claim 12, further comprising in response to determining that the selection of the customized option for the log has been received, providing, using the display screen, options to perform at least one of:
   deleting at least a first object from the log of the sub-plurality of objects;
   archiving at least the first object from the log of the sub-plurality of objects prior to the deleting; and
   creating a multi-media album of the sub-plurality of objects.

14. The method of claim 9, wherein the providing the log comprises providing, using the display screen, a listing of the sub-plurality of objects.

15. The method of claim 9, wherein, for each one of the previously-defined modes, the electronic device uses a different respective set of parameters to search an identification database for identifying at least one of the objects of the plurality of objects.

16. An electronic device comprising:
a display; and
a processor operative to:
- identify a first subset of a plurality of objects according to a first mode of the electronic device;
- identify a second subset of the plurality of objects according to a second mode of the electronic device;
- direct the display to display a listing of identification information associated with the plurality of objects;
- receive a user selection of at least one object of the first subset of the plurality of objects from the listing of the identification information, wherein the user selection is based on a user provided selection of the first mode specifying the type of object the user wants to identify;
- direct the display to display basic information associated with the at least one selected object and at least one selectable option for accessing additional information associated with the at least one selected object;
- receive a user selection of the at least one selectable option; and
- in response to the user selection of the at least one selectable option, access additional information associated with the at least one selected object on a database.

17. The electronic device of claim 16, wherein the database is located on at least one of a storage medium of the electronic device and an external source.

18. The electronic device of claim 16, further comprising a storage medium operative to store the additional information associated with the at least one selected object.

19. The electronic device of claim 16, further comprising an identification module operative to activate an RFID tag reader to read passive RFID tags of the plurality of objects.

20. The electronic device of claim 16, wherein the processor is operative to identify the first subset according to the first mode by searching using a first set of parameters, and wherein the processor is operative to identify the second subset according to the second mode by searching using a second set of parameters that is different than the first set of parameters.

21. An electronic device comprising:
a display;
a processor operative to:
- direct the display to display a listing of identification information associated with a plurality of objects;
- receive a user selection of at least one object of the plurality of objects from the listing of the identification information, wherein the user selection is based on a user provided mode specifying the type of object the user wants to identify;
- direct the display to display basic information associated with the at least one selected object and at least one selectable option for accessing additional information associated with the at least one selected object;
- receive a user selection of the at least one selectable option; and
- in response to the user selection of the at least one selectable option, access additional information associated with the at least one selected object on a database; and communications circuitry to:
- determine a location of the electronic device; and
- in response to determining the location, detect the plurality of objects that are positioned near the location of the electronic device via at least one electronic signal being broadcasted from the plurality of objects.

22. The electronic device of claim 21, wherein the processor is operative to determine the identification information based on the user provided mode and the location of the electronic device.

23. The electronic device of claim 21, wherein the communications circuitry comprises wireless circuitry operative to connect to a communications line to access the additional information.

* * * * *

UNITED STATES PATENT AND TRADEMARK OFFICE
CERTIFICATE OF CORRECTION

| | | |
|---|---|---|
| PATENT NO. | : 8,781,262 B2 | Page 1 of 1 |
| APPLICATION NO. | : 13/555927 | |
| DATED | : July 15, 2014 | |
| INVENTOR(S) | : Michael Rosenblatt | |

It is certified that error appears in the above-identified patent and that said Letters Patent is hereby corrected as shown below:

In The Claims

In Column 16, Line 50, delete "for period" and insert -- for a period --, therefor.

Signed and Sealed this
Sixteenth Day of February, 2016

Michelle K. Lee
*Director of the United States Patent and Trademark Office*